United States Patent
Torjesen et al.

(10) Patent No.: US 12,496,140 B2
(45) Date of Patent: Dec. 16, 2025

(54) AUTOMATIC FIELD OF VIEW UPDATING OF POSITION TRACKED INTERVENTIONAL DEVICE

(71) Applicant: KONINKLIJKE PHILIPS N.V., Eindhoven (NL)

(72) Inventors: Alyssa Torjesen, Charlestown, MA (US); Molly Lara Flexman, Melrose, MA (US); Torre Michelle Bydlon, Melrose, MA (US); Ashish Panse, Burlington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 132 days.

(21) Appl. No.: 16/640,075

(22) PCT Filed: Aug. 23, 2018

(86) PCT No.: PCT/EP2018/072738
§ 371 (c)(1),
(2) Date: Feb. 19, 2020

(87) PCT Pub. No.: WO2019/042854
PCT Pub. Date: Mar. 7, 2019

(65) Prior Publication Data
US 2020/0253668 A1 Aug. 13, 2020

Related U.S. Application Data

(60) Provisional application No. 62/550,710, filed on Aug. 28, 2017.

(51) Int. Cl.
*A61B 34/20* (2016.01)
*A61B 90/00* (2016.01)

(52) U.S. Cl.
CPC .............. *A61B 34/20* (2016.02); *A61B 90/37* (2016.02); *A61B 2034/2051* (2016.02);
(Continued)

(58) Field of Classification Search
USPC ........................................................ 600/424
See application file for complete search history.

(56) References Cited

U.S. PATENT DOCUMENTS 8,147,503 B2 4/2012 Zhao
2007/0055131 A1* 3/2007 Deinzer ................. A61B 90/11
600/407

(Continued)

FOREIGN PATENT DOCUMENTS

JP 2005111110 A 4/2005
WO 2015086364 6/2015
(Continued)

OTHER PUBLICATIONS https://radiologykey.com/basic-three-dimensional-postprocessing-in-computed-tomographic-and-magnetic-resonance-angiography/ date accessed: Feb. 28, 2024 (Year: 2015).*

(Continued)

*Primary Examiner* — Christopher Koharski
*Assistant Examiner* — Renee C Langhals

(57) ABSTRACT

A position tracker driven display system for an interventional device (50) including an integration of one or more position trackers and one or more interventional tools. The position tracker driven display system employs a monitor (121) and a display controller (110) for controlling a real-time display on the monitor (121) of a tracking image illustrative of a navigation of a tracking node of the interventional device (50) within an anatomical region. The display controller (110) autonomously selects the tracking image among a plurality of registered spatial images illus- (Continued)

trative of the anatomical region within an image space based on position tracking data informative of a position of the at least one position tracker within the anatomical region. The display controller (110) derives the autonomous selection of the tracking image from a position of the tracking node of the interventional device (50) relative to the image space as indicated by the position tracking data.

19 Claims, 16 Drawing Sheets

(52) U.S. Cl.
CPC .............. *A61B 2034/2055* (2016.02); *A61B 2034/2063* (2016.02); *A61B 2090/374* (2016.02); *A61B 2090/376* (2016.02); *A61B 2090/3762* (2016.02); *A61B 2090/378* (2016.02)

(56) References Cited

U.S. PATENT DOCUMENTS

| | | | | |
|---|---|---|---|---|
| 2013/0216025 A1* | 8/2013 | Chan | ............... | A61B 6/488 378/63 |
| 2013/0258079 A1 | 10/2013 | Rose | | |
| 2014/0276002 A1* | 9/2014 | West | ............... | A61B 5/061 600/424 |
| 2015/0305650 A1* | 10/2015 | Hunter | ............... | A61B 10/04 600/424 |
| 2015/0374260 A1* | 12/2015 | Govari | ............... | A61B 5/7425 600/417 |
| 2016/0000517 A1* | 1/2016 | Kehat | ............... | G06F 3/14 600/424 |
| 2016/0125607 A1* | 5/2016 | Gulaka | ............... | G06T 7/74 382/128 |
| 2016/0171714 A1 | 6/2016 | Ekin | | |
| 2017/0202625 A1* | 7/2017 | Bharat | ............... | A61B 8/5261 |
| 2017/0348067 A1* | 12/2017 | Krimsky | ............... | A61B 34/10 |
| 2017/0367685 A1 | 12/2017 | Zou | | |
| 2019/0290366 A1* | 9/2019 | Pettersson | ............... | A61B 34/20 |
| 2020/0078103 A1* | 3/2020 | Duindam | ............... | A61B 34/25 |

FOREIGN PATENT DOCUMENTS

| | | |
|---|---|---|
| WO | 2017051279 | 3/2017 |
| WO | 2017/055976 | 4/2017 |
| WO | 2019092225 | 5/2019 |

OTHER PUBLICATIONS https://radiologykey.com/basic-three-dimensional-postprocessing-in-computed-tomographic-and-magnetic-resonance-angiography/ date accessed: Jul. 30, 2024 (Year: 2015).*

International Search Report and Written Opinion Dated Feb. 4, 2019 for International Application No. PCT/EP2018/072738 Filed Aug. 23, 2018.

Neurosurgeon Lk: "Image Guided Surgery for Brain Tumors copy", Youtube, Nov. 2, 2015 (Nov. 2, 2015), XP054978846, Retrieved from the Internet: URL:https://www.youtube.com/watch?v=N6Xn-e900Q [retrieved on [Nov. 8, 2018].

Stryker: "Stryker NAVBi Navigation Platform—The Ultimate Surgical Navigation Experience", Youtube, Mar. 15, 2015 (Mar. 15, 2015), p. 1 pp., XP054978848, Retrieved from the Internet: URLihttps://www.youtube.com/watch?v=dthxHykIKvQ [retrieved on Nov. 12, 2018].

* cited by examiner

AUTOMATIC FIELD OF VIEW UPDATING OF POSITION TRACKED INTERVENTIONAL DEVICE

CROSS REFERENCE TO RELATED APPLICATIONS

This application is the U.S. National Phase application under 35 U.S.C. § 371 of International Application No. PCT/EP2018/072738 filed Aug. 23, 2018, published as WO 2019/042854 on Mar. 7, 2019, which claims the benefit of U.S. Provisional Patent Application No. 62/550,710 filed Aug. 28, 2017. These applications are hereby incorporated by reference herein.

FIELD OF THE INVENTION

The inventions of the present disclosure generally relate to a real-time display of images illustrative of an interventional device within an anatomical region based on position tracking technology informative of a position (i.e., a location and/or orientation) of the interventional device within the anatomical region.

The inventions of the present disclosure more particularly relate to automatic updates to a real-time display of images illustrative of a navigation of an interventional device within the anatomical region based on position tracking technology information of the position of the interventional device within the anatomical region.

BACKGROUND OF THE INVENTION

Endovascular procedures typically rely on fluoroscopic imaging throughout the procedure to track a position (i.e., a location and/or orientation) of an interventional tool within an anatomical region, where a fluoroscopic imaging field of view is manually updated throughout the procedure to keep the interventional tool within the fluoroscopic imaging field of view.

For example, FIG. 1A illustrates a fluoroscopic image 11a of a vascular structure 12 as displayed in real-time on a monitor 10. A distal tip 13 (FIG. 1B) of a vascular interventional tool changes positions as distal tip 13 is navigated within vascular structure 12 whereby a current position of distal tip 13 within a field of view of fluoroscopic image 11a is illustrated in fluoroscopic image 11a, such as for example, an illustration of a position of distal tip 13 within a field of view of fluoroscopic image 11a as shown in FIG. 1B. Conversely, a positioning of distal tip 13 beyond the field of view of fluoroscopic image 11a is not illustrated in fluoroscopic image 11a as exemplary shown in FIG. 1C. As such, when distal tip 13 is moved beyond the field of view of fluoroscopic image 11a, an imaging position of a fluoroscopic source and detector must be manually adjusted to enable an illustration of distal tip 13 within a field of view of an updated fluoroscopic image, such as, for example, an illustration of a position of distal tip 13 within a field of view of an updated fluoroscopic image 11b as shown in FIG. 1D.

Alternative or supplemental to fluoroscopic imaging tracking, position tracking technology as known in the art of the present disclosure may be utilized for tracking a position (i.e., a location and/or orientation) of an interventional tool within an anatomical region.

For example, optical shape sensing (OSS) technology uses light along a single core or a multicore optical fiber for device localization and navigation during surgical intervention. The principle involved makes use of distributed strain measurements in the optical fiber using characteristic Rayleigh backscatter or controlled grating patterns. The shape along the optical fiber begins at a specific point along the sensor, known as the launch or $z=0$, and the subsequent shape position and orientation of the optical fiber are relative to that point.

An OSS fiber may be integrated into an interventional tool (e.g., vascular tools, endoluminal tools and orthopedic tools) to thereby provide live visual guiding via a monitor of the interventional tool during a minimally invasive procedure (e.g., an endovascular procedure) whereby the integrated OSS fiber provides a position (i.e., a location and/or an orientation) of a portion or an entirety of the interventional tool.

A key feature of shape sensing of an optical fiber is that it provides three-dimensional ("3D") information about the entire shape of a device having the optical fiber embedded therein. A challenge is how to properly visualize and communicate the 3D information of the optically shaped sensed interventional tool to a navigator of the interventional tool without any need for an iterative manual adjustment of an anatomical imaging modality being operated to image the procedure.

Also by example, electromagnetic sensing (EM) technology uses a field generator to generate an electromagnetic field for tracking of a position of one or more EM coil sensor(s) relative to the field generator. More particularly, the electromagnetic field induces a current in the EM coil sensor(s) whereby a magnitude of the current is dependent on the position of the EM coil sensor(s) relative to the field generator.

As with an OSS fiber, EM coil sensor(s) may be integrated into an interventional tool (e.g., vascular tools, endoluminal tools and orthopedic tools) to thereby provide live visual guiding via a monitor of the interventional tool during a minimally invasive procedure (e.g., an endovascular procedure) whereby the integrated EM coil sensor(s) provides a position (i.e., a location and/or an orientation) of a portion or an entirety of the interventional tool. Again, a challenge is how to properly visualize and communicate the electromagnetically sensed interventional tool to a navigator of the interventional tool without any need for an iterative manual adjustment of an anatomical imaging modality being operated to image the procedure.

By further example, InSitu technology uses one or more InSitu sensors (e.g., an ultrasound sensor) to sense an imaging energy within the anatomical region (e.g., an ultrasound probe transmitting ultrasound energy within the anatomical region). More particularly, a parameter of imaging energy as sensed by the InSitu sensor is dependent on the position of the InSitu sensor within the anatomical region (e.g., a time of flight of ultrasound energy to an ultrasound sensor).

As with an OSS fiber, InSitu sensor(s) may be integrated into an interventional tool (e.g., vascular tools, endoluminal tools and orthopedic tools) to thereby provide live visual guiding via a monitor of the interventional tool during a minimally invasive procedure (e.g., an endovascular procedure) whereby the integrated InSitu sensor(s) provides a position (i.e., a location and/or an orientation) of a portion or an entirety of the interventional tool. Again, a challenge is how to properly visualize and communicate the InSitu sensed interventional tool to a navigator of the interventional tool without any need for an iterative manual adjustment of an anatomical imaging modality being operated to image the procedure.

SUMMARY OF THE INVENTION

To improve upon prior systems, controllers and methods for displaying a navigation of an interventional tool within an anatomical region during an interventional procedure of any type, the present disclosure provides inventions for automatically updating a real-time display of images illustrative of a navigation of the interventional device within the anatomical region based on position tracking technology information of a position (i.e., a location and/or an orientation) of the interventional device within the anatomical region.

One embodiment of the inventions of the present disclosure is a position tracker driven display system for a display of an interventional device including an integration of one or more position trackers (e.g., a OSS sensor, EM sensor(s) and/or InSitu sensor(s)) and one or more interventional tools (e.g., a guidewire and/or a catheter).

The position tracker driven display system employs a monitor and a display controller for controlling a real-time display on the monitor of a tracking image illustrative of a navigation of a tracking node of the interventional device within an anatomical region.

The display controller autonomously selects the tracking image among a plurality of registered spatial images illustrative of the anatomical region within an image space based on position tracking data informative of a position of the position tracker(s) within the anatomical region.

The display controller derives the autonomous selection of the tracking image from a position of the tracking node of the interventional device relative to the image space as indicated by the position tracking data.

A second embodiment of the inventions of the present disclosure is a position tracker driven display method for a display of an interventional device including an integration of one or more position trackers (e.g., a OSS sensor, EM sensor(s) and/or InSitu sensor(s)) and one or more interventional tools (e.g., a guidewire and/or a catheter).

The position tracker driven display method involves a display controller autonomously selecting a tracking image among a plurality of registered spatial images illustrative of the anatomical region within an image space based on position tracking data informative of a position of the position tracker(s) within the anatomical region.

The display controller derives the autonomous selection of the tracking image from a position of a tracking node of the interventional device relative to the image space as indicated by the position tracking data.

The position tracker driven display method further involves the display controller controlling a real-time display on a monitor of the tracking image illustrative of a navigation of the tracking node of the interventional device within an anatomical region.

For purposes of describing and claiming the inventions of the present disclosure:

(1) terms of the art of the present disclosure including, but not limited to, "monitor", "imaging modality", "registration" and "real-time" are to be interpreted as known in the art of the present disclosure and exemplary described in the present disclosure;

(2) the term "anatomical region" broadly encompasses, as known in the art of the present disclosure and exemplary described in the present disclosure, one or more anatomical systems with each anatomical system having a natural or a surgical structural configuration for a navigation of an interventional device therein. Examples of an anatomical region include, but are not limited to, an integumentary system (e.g., skin and appendages), a skeletal system, a muscular system, a nervous system, an endocrine system (e.g., glands and pancreas), a digestive system (e.g., stomach, intestines, and colon), a respiratory system (e.g., airways and lungs), a circulatory system (e.g., heart and blood vessels), a lymphatic system (e.g., lymph nodes), a urinary system (e.g., kidneys), and reproductive system (e.g., uterus);

(3) the term "interventional tool" is to be broadly interpreted as known in the art of the present disclosure including interventional tools known prior to and conceived after the present disclosure. Examples of an interventional tool include, but are not limited to, vascular interventional tools (e.g., guidewires, catheters, stents sheaths, balloons, atherectomy catheters, IVUS imaging probes, deployment systems, etc.), endoluminal interventional tools (e.g., endoscopes, bronchoscopes, etc.) and orthopedic interventional tools (e.g., k-wires and screwdrivers);

(4) the term "position tracker" broadly encompasses all devices, as known in the art of the present disclosure and hereinafter conceived, for tracking a position of an interventional tool within an anatomical region. Examples of a position sensor include, but are not limited to, a OSS sensor, an EM sensor and a InSitu sensor;

(5) the term "OSS sensor" broadly encompasses an optical fiber configured, as known in the art of the present disclosure and hereinafter conceived, for extracting high density strain measurements of the optical fiber derived from light emitted into and propagated through the optical fiber and reflected back within the optical fiber in an opposite direction of the propagated light and/or transmitted from the optical fiber in a direction of the propagated light. An example of an OSS sensor includes, but is not limited to, an optical fiber configured under the principle of Optical Frequency Domain Reflectometry (OFDR) for extracting high density strain measurements of the optical fiber derived from light emitted into and propagated through the optical fiber and reflected back within the optical fiber in an opposite direction of the propagated light and/or transmitted from the optical fiber in a direction of the propagated light via controlled grating patterns within the optical fiber (e.g., Fiber Bragg Grating), a characteristic backscatter of the optical fiber (e.g., Rayleigh backscatter) or any other arrangement of reflective node element(s) and/or transmissive node element(s) embedded, etched, imprinted, or otherwise formed in the optical fiber;

(6) the term "EM sensor" broadly encompasses any device configured, as known in the art of the present disclosure and hereinafter conceived, for sensing an electromagnetic field;

(7) the term "InSitu sensor" broadly encompasses any device configured, as known in the art of the present disclosure and hereinafter conceived, for sensing an imaging energy (e.g., an ultrasound wave);

(8) "an integration of one or more position trackers and one or more interventional tools" broadly encompasses any type of combining, adjoining, attaching, mounting, insertion, intermingling or otherwise integrating of position tracker(s) into interventional tool(s) to form an interventional device as understood in the art of the present disclosure and exemplary described in the present disclosure. Examples of such an integration include, but are not limited to, a fixed insertion of position tracker(s) within a channel of a catheter and a guidewire incorporating position tracker(s);

(9) the term "tracking node" broadly encompasses any portion or an entirety of an interventional device;

(10) the term "tracking image" broadly encompasses any two-dimensional (2D) image or three-dimensional (3D) image illustrative of a tracking node of an interventional device within an anatomical region. Examples of a tracking image include, but are not limited to, (a) a 2D or a 3D image of the anatomical region illustrative of a tracking node of an interventional device within the anatomical region and (b) a 3D model of the anatomical region generated from a 3D image of the anatomical region illustrative of a tracking node of an interventional device within the anatomical region;

(11) the term "image space" broadly encompasses any XYZ coordinate system enclosing an imaging of a portion or an entirety of an anatomical region. Examples of an imaging space include, but are not limited to, (a) an XYZ coordinate system enclosing an imaging of a portion or an entirety of an anatomical region and (b) an XYZ coordinate system enclosing a portion or an entirety of a 3D model of an anatomical region generated from a 3D image of the anatomical region;

(12) the term "spatial image" broadly encompasses any two-dimensional (2D) image slice or any three-dimensional (3D) image slice of the image space;

(13) the term "registered spatial image" broadly encompasses a spatial image individually registered to a shape of the OSS sensor;

(14) the term "position tracking driven display system" broadly encompasses, as known in the art of the present disclosure and hereinafter conceived, all interventional systems utilized in interventional procedures incorporating the inventive principles of the present disclosure for an automatic update of a real-time display of images illustrative of a navigation of the interventional device within the anatomical region based on position tracking technology information of a position (i.e., a location and/or an orientation) of the interventional device within the anatomical region. Examples of such interventional systems include all interventional systems commercially offered for sale and sold by Philips as known in the art of the present disclosure that hereinafter incorporate the inventive principles of the present disclosure;

(12) the term "position tracking driven display method" broadly encompasses, as known in the art of the present disclosure and hereinafter conceived, all interventional methods utilized in interventional procedures incorporating the inventive principles of the present disclosure for an automatic update of a real-time display of images illustrative of a navigation of the interventional device within the anatomical region based on position tracking technology information of a position (i.e., a location and/or an orientation) of the interventional device within the anatomical region. Examples of such interventional methods include all interventional methods commercially offered for sale and sold by Philips as known in the art of the present disclosure that hereinafter incorporate the inventive principles of the present disclosure;

(13) the term "controller" broadly encompasses all structural configurations of an application specific main board or an application specific integrated circuit for controlling an application of various inventive principles of the present disclosure related to an automatic display of a real-time display of images illustrative of a navigation of the interventional device within the anatomical region based on optical shape sensing (OSS) technology information of a position (i.e., a location and/or an orientation) of the interventional device within the anatomical region as subsequently exemplarily described in the present disclosure. The structural configuration of the controller may include, but is not limited to, processor(s), computer-usable/computer readable storage medium(s), an operating system, application module(s), peripheral device controller(s), interface(s), bus(es), slot(s) and port(s). The labels "OSS sensor", "OSS shape" and "display" as used in the present disclosure for the term "controller" distinguishes for identification purposes a particular controller from other controllers as described and claimed herein without specifying or implying any additional limitation to the term "controller".

(14) the term "application module" broadly encompasses a component of a controller consisting of an electronic circuit and/or an executable program (e.g., executable software and/or firmware stored on non-transitory computer readable medium(s)) for executing a specific application. The labels "Shape Reconstructor", "Image Selector" and "Image Displayer" used herein for the term "module" distinguishes for identification purposes a particular module from other modules as described and claimed herein without specifying or implying any additional limitation to the term "application module"; and

(15) the terms "signal", "data", and "command" broadly encompasses all forms of a detectable physical quantity or impulse (e.g., voltage, current, or magnetic field strength) as understood in the art of the present disclosure and as exemplary described in the present disclosure for communicating information and/or instructions in support of applying various inventive principles of the present disclosure as subsequently described in the present disclosure. Signal/data/command communication between components of the present disclosure may involve any communication method, as known in the art of the present disclosure and hereinafter conceived, including, but not limited to, signal/data/command transmission/reception over any type of wired or wireless medium/datalink and a reading of signal/data/command uploaded to a computer-usable/computer readable storage medium.

The foregoing embodiments and other embodiments of the inventions of the present disclosure as well as various features and advantages of the inventions of the present disclosure will become further apparent from the following detailed description of various embodiments of the inventions of the present disclosure read in conjunction with the accompanying drawings. The detailed description and drawings are merely illustrative of the inventions of the present disclosure rather than limiting, the scope of the inventions of the present disclosure being defined by the appended claims and equivalents thereof.

DETAILED DESCRIPTION OF THE PREFERRED EMBODIMENTS

As an improvement upon a prior display of images illustrative of a navigation of an interventional device within an anatomical region, the inventions of the present disclosure are premised on a generation of a plurality of spatial images illustrative of an anatomical region within an image space whereby an optical shape sensed position of a tracking node of an OSS interventional device relative to the image space is determinative of an autonomous selection of one of the spatial images for display and may be further determinative of autonomous display format of the selected spatial image.

To facilitate an understanding of the various inventions of the present disclosure, the following description of FIGS. 2A-3G conceptually teaches a generation of a plurality of spatial images illustrative of an anatomical region within an image space and a position tracking of a node of an OSS interventional device relative to the image space for purposes of displaying a navigation of the OSS interventional device within the anatomical region in accordance with the inventive principles of the present invention. From the description of FIGS. 2A-3G, those having ordinary skill in the art will appreciate the inventive principles of the present disclosure.

Figure 1A:
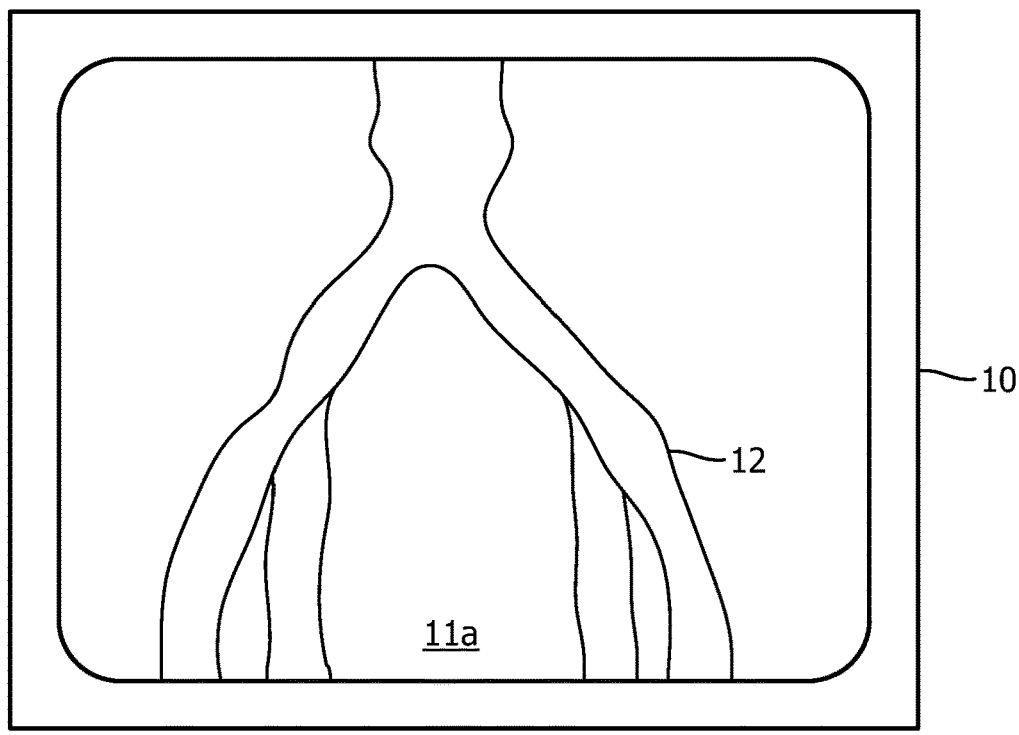
FIGS. 1A-1D illustrates an exemplary display of images illustrative of a navigation of an interventional device within an anatomical region as known in the art of the present disclosure.
Figure 1B:
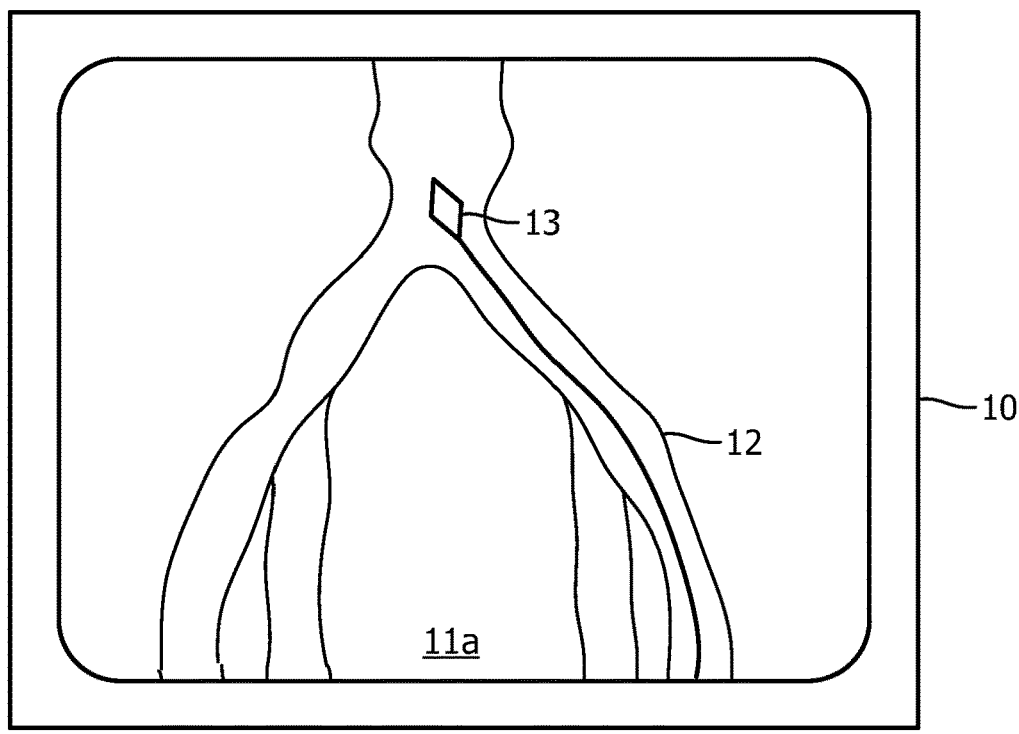
Figure 1C:
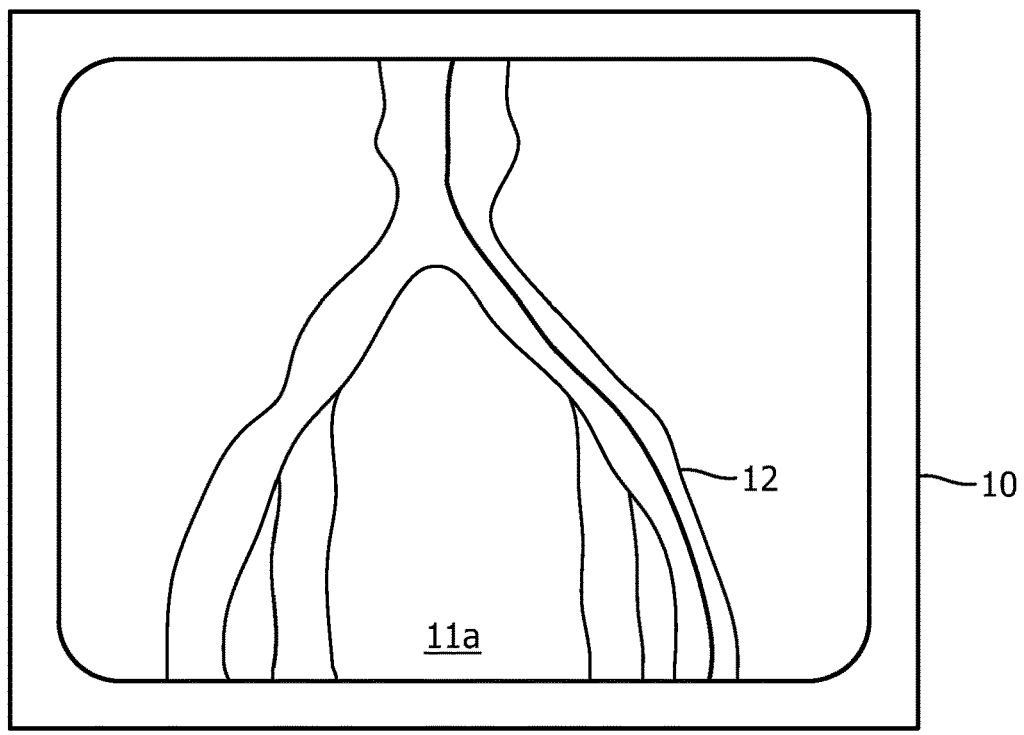
Figure 1D:
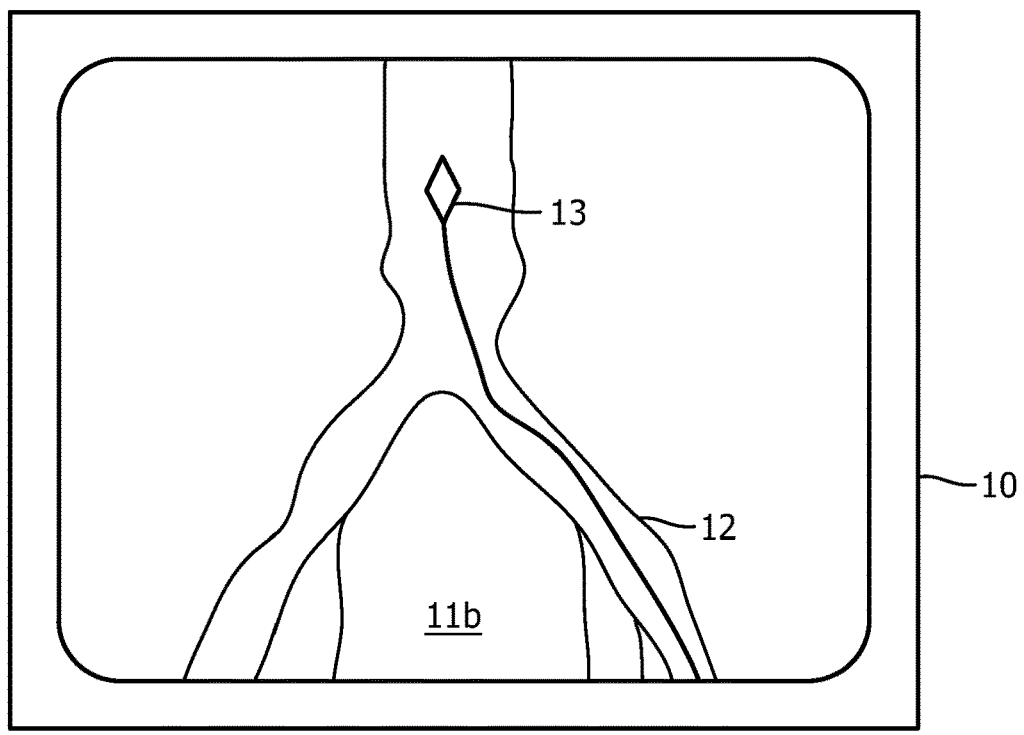
Figure 2A:
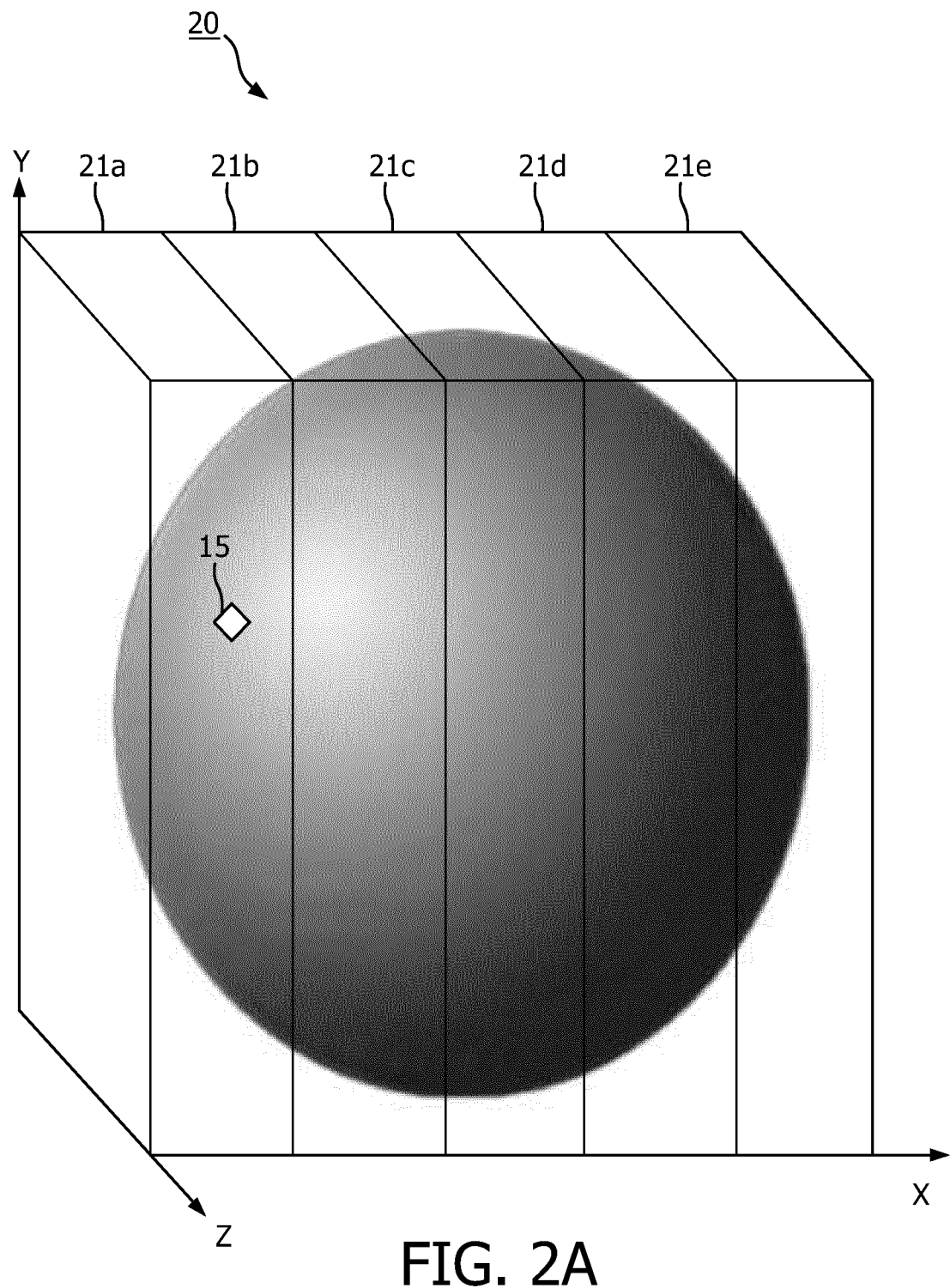
FIGS. 2A-2C illustrate exemplary spatial images of an anatomical region in accordance with the inventive principles of the present disclosure.
Figure 2B:
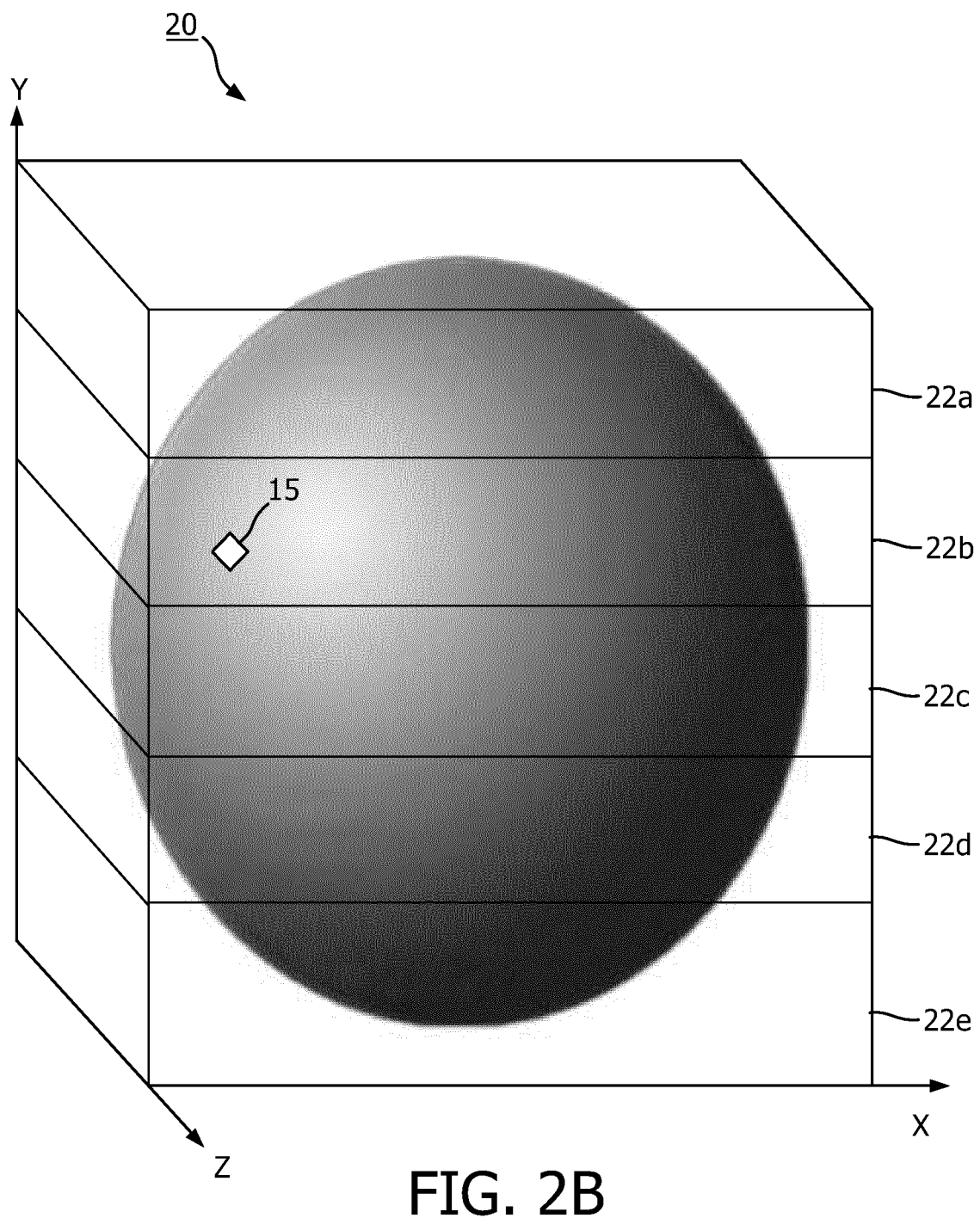
Figure 2C:
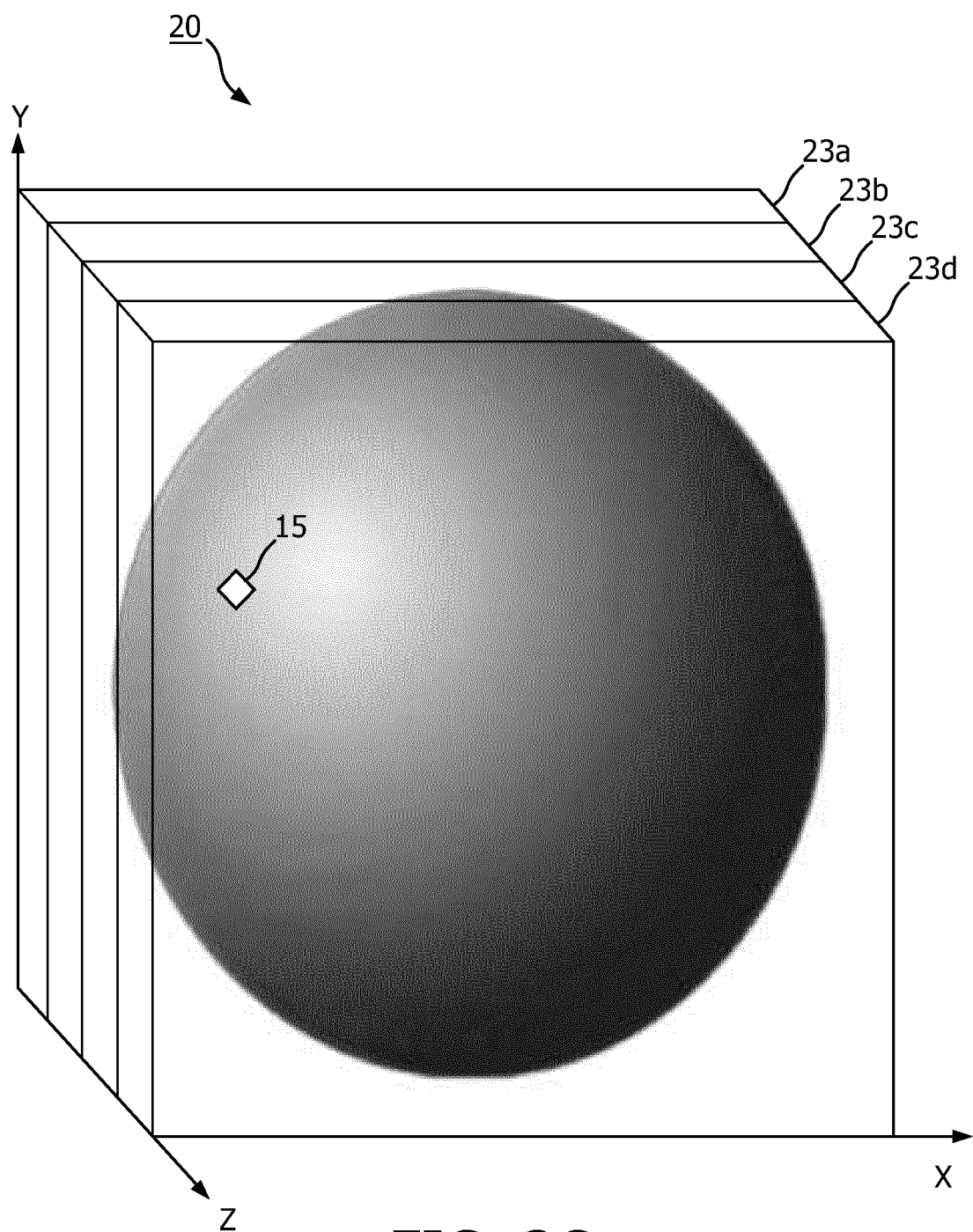

Referring to FIGS. 2A-2C, an image space 20 is an XYZ coordinate system enclosing an imaging of an anatomical region represented by a sphere. The inventions of the present disclosure are premised on a slicing of image space 20, preferably in an axial direction, into a series of spatial images that may be individually displayed as a two-dimensional (2D) image or as a three-dimensional image.

A display of a spatial image as a 2D image may include, but not limited to, XY planar view of the spatial image in a Z-direction, a XZ planar image of the spatial image in a Y-direction and or a YZ planar image of the spatial image viewed in a X-axis direction.

A display of a spatial image as a 3D image may include, but not limited to, XYZ volumetric image of the spatial view viewed in a X-axis direction, a Y-axis direction or a Z-axis direction.

For example, as shown in FIG. 2A, image space 20 may be sliced in an X-axis direction into a series of spatial images 21a-21e that may be individually displayed as a 2D image or a 3D image.

By further example, as shown in FIG. 2B, image space 20 may be sliced in a Y-axis direction into a series of spatial images 22a-22e that may be individually displayed as a 2D image or a 3D image.

By even further example, as shown in FIG. 2C, image space may be sliced in a Z-axis direction into a series of spatial images 23a-23d that may be individually displayed as a 2D image or a 3D image.

In practice, an axial depth of a slicing of an image space is dependent upon a desired degree of automatic update resolution as further exemplary described in the present disclosure.

Also in practice, an axial depth of a slicing of an image space may be constant or variable.

Still referring to FIGS. 2A-2C, the inventions of the present disclosure are further premised on an optical shape sensed position of a tracking node of an interventional device within the image space of the anatomical region being determinative of an autonomous selection of one of the spatial images for display.

In practice, the optical shape sensed position of the tracking node of the interventional device may be defined by a XYZ location of the tracking node relative to the image space whereby the spatial image associated with the XYZ location is autonomously selected for display.

For example, as shown in FIG. 2A, an XYZ location of a tracking node 15 is within spatial image 21a, and therefore spatial image 21a is automatically selected for display as a 2D image or a 3D image.

For example, as shown in FIG. 2B, an XYZ location of a tracking node 15 is within spatial image 22b, and therefore spatial image 22b is automatically selected for display as a 2D image or a 3D image.

For further example, as shown in FIG. 2C, an XYZ location of a tracking node 15 is within spatial image 23d, and therefore spatial image 23d is automatically selected for display as a 2D image or a 3D image.

Concurrently, as will be further described in the present disclosure, the optical shape sensed position of the tracking node of the interventional device may be defined by an αβγ orientation of the tracking node within the image space whereby a spatial image autonomously selected based on the XYZ location of the tracking node within the image space may be displayed in a planar view best suitable for viewing the αβγ orientation of the tracking node within the image space. For example, an αβγ orientation of the tracking node within the image space may be parallel with the X-axis whereby an YZ planar view of the selected spatial image would be suited for viewing a front view or a rear view of the αβγ orientation of the tracking node within the image space or whereby an XY planar view or an ZY planar view of the selected spatial image would be suited for viewing a side view of the αβγ orientation of the tracking node within the image space.

Alternatively, the optical shape sensed position of the tracking node of the interventional device may be defined by the $\alpha\beta\gamma$ orientation of the tracking node relative to the image space whereby a spatial image best suitable for viewing the $\alpha\beta\gamma$ orientation of the tracking node relative to the image space (e.g., the $\alpha\beta\gamma$ orientation of the tracking node within the image space as located in one spatial image is directed to a an adjacent spatial image which is autonomously selected for display).

In practice, an optical shape sensed position of a tracking node of the interventional device may be external to the image space. For such external positioning of the tracking node, a spatial image closest to the tracking node or best suited for an orientation view of the tracking node may be selected for display.

Also in practice, a tracking node of the OSS interventional device may be positioned within two or more spatial images. For such positioning of the tracking node, a spatial image enclosing a majority of the tracking node, a highest degree of the tracking node, or a designated portion/point of the tracking node may be selected for display.

Further in practice, each spatial image is individually registered to the OSS interventional device for purposes of facilitating an autonomous selection of one of the spatial images of the display as will be further described in the present disclosure.

Still referring to FIGS. 2A-2C, the inventions of the present disclosure implement an image replacement scheme involving an automatic updating of the display in real-time from a previously selected spatial image to a newly selected spatial image based on the movements of the tracking node of the OSS interventional device within the image space.

Figure 3A:
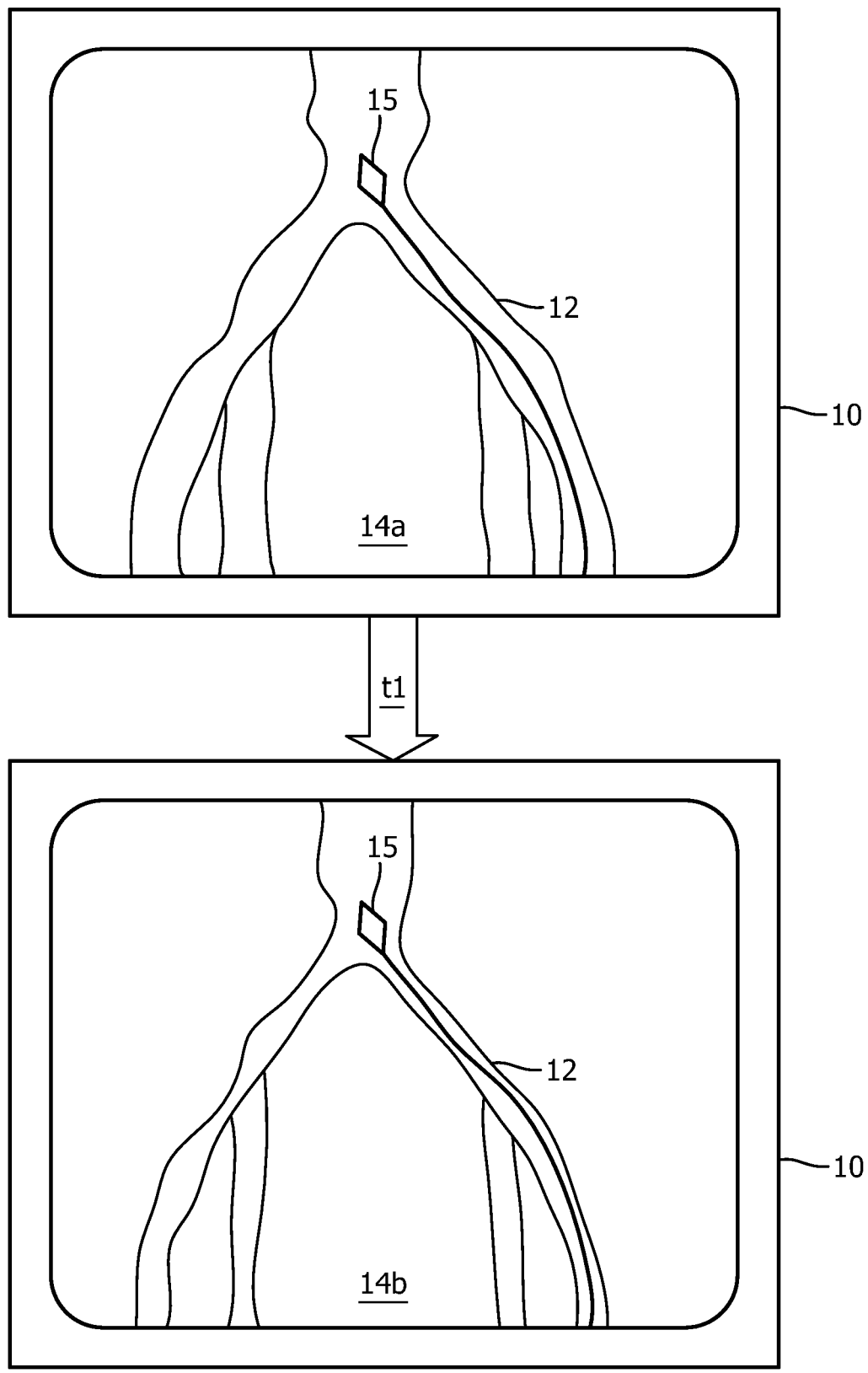
FIGS. 3A-3G illustrate exemplary display of images illustrative of a navigation of an OSS interventional device within an anatomical region in accordance with the inventive principles of the present disclosure.

For example, as shown in FIG. 3A, a spatial image 14a illustrating a centerline view of a vascular structure 12 is a selected spatial image at a time t0 for display on monitor 10 based on an optically shaped sensed position of a tracking node 15 of the interventional device within or pointing to spatial image 14a whereby spatial image 14a is automatically replaced for display on monitor 10 at a subsequent time t1 by a newly selected spatial image 14b illustrating an off centerline view of vascular structure 12 based on a re-positioning on an optically shaped sensed position of tracking node 15 of the interventional device within or pointing to spatial image 14b.

Figure 3B:
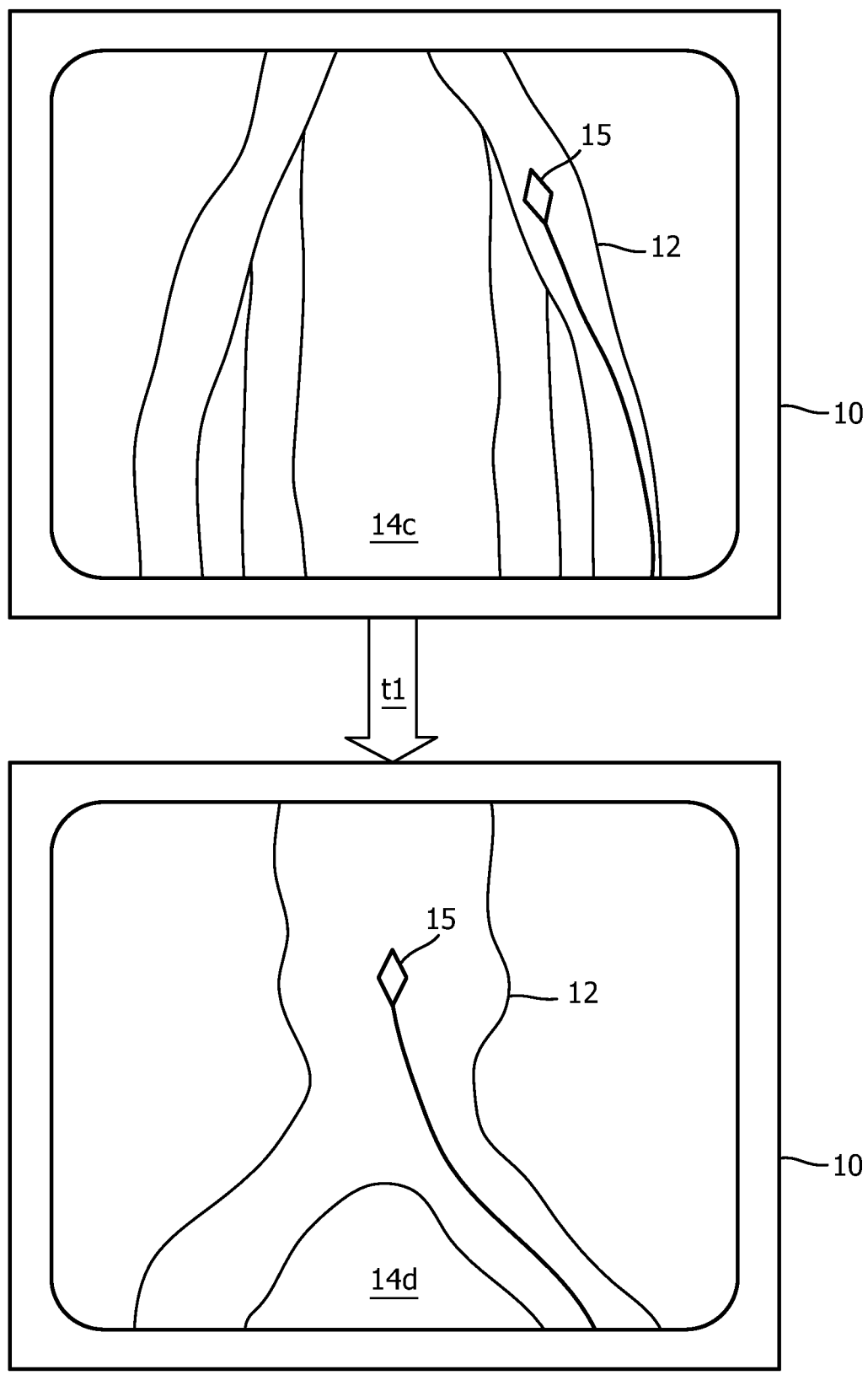

By further example, as shown in FIG. 3B, a spatial image 14c illustrating a lower view of vascular structure 12 is a selected spatial image at a time to for display on monitor 10 based on an optically shaped sensed position of a tracking node 15 of the interventional device within or pointing to spatial image 14c whereby a spatial image 14d is automatically replaced for display on monitor 10 at a subsequent time t1 by a newly selected spatial image 14d illustrating an upper view of vascular structure 12 based on a re-positioning on an optically shaped sensed position of a tracking node 15 of the interventional device within or pointing to spatial image 14d.

Still referring to FIGS. 2A-2C, the inventions of the present disclosure may be further premised on an optical shape sensed position of a tracking node of an OSS interventional device relative to the image space of the anatomical region also being determinative of an autonomous display format of the selected spatial image.

In a default display embodiment, a selected spatial image may be displayed in a default X-axis direction, a default Y-axis direction or a default Z-axis direction.

Figure 3C:
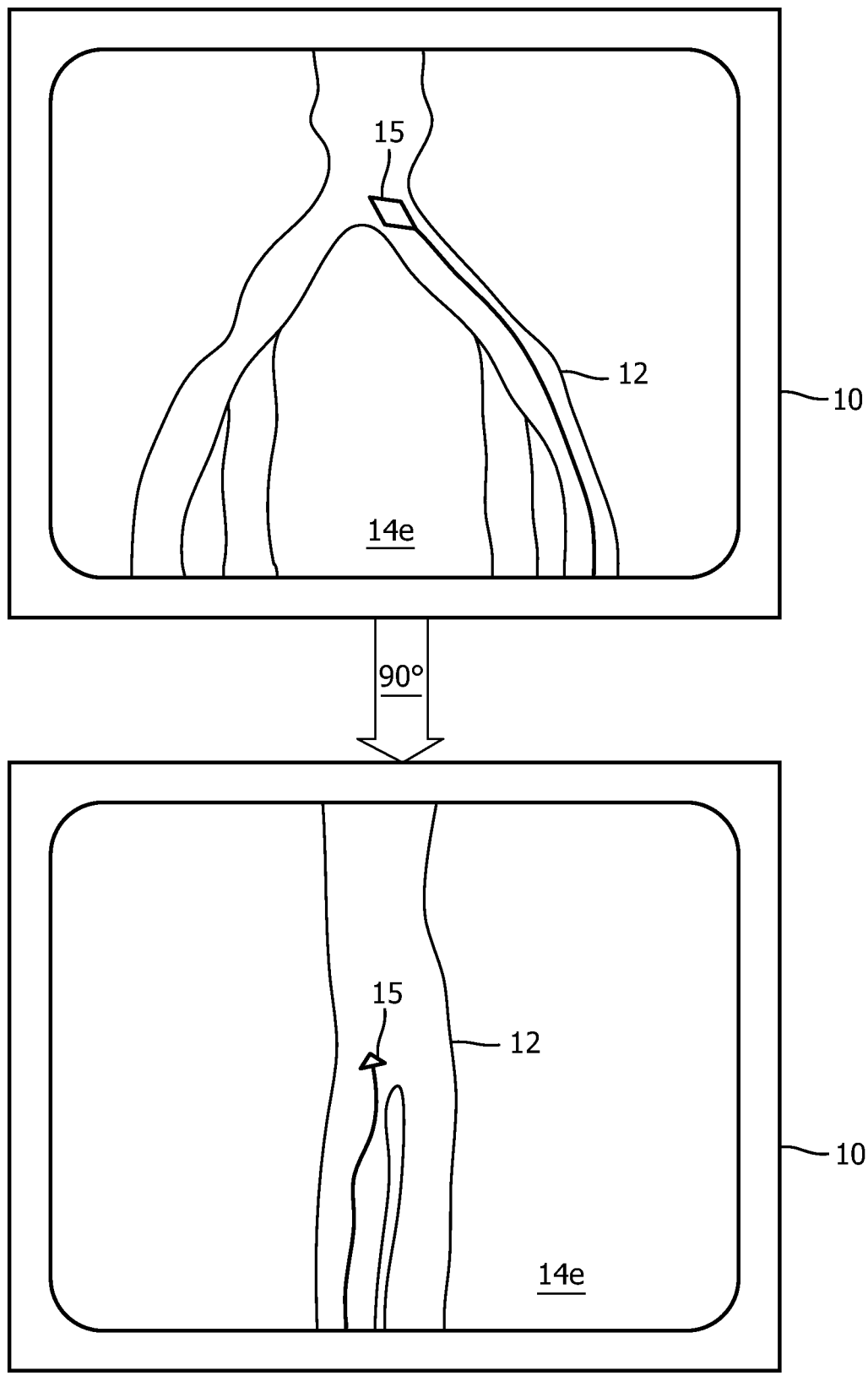

In a rotational embodiment, a selected spatial image may be displayed in a planar view best suitable for viewing the $\alpha\beta\gamma$ (e.g. Euler angle) orientation of the tracking node within the image space. For example, FIG. 3C illustrates a ninety (90) degree rotation of a spatial image 14a from a side planar view of tracking node 15 of the interventional device to a rear planar view of tracking node 15.

In a shifting embodiment, a selected spatial image may be displayed in a laterally shifted view when an optical shape sensed position of a tracking node of an OSS interventional device is external to the image space.

Figure 3D:
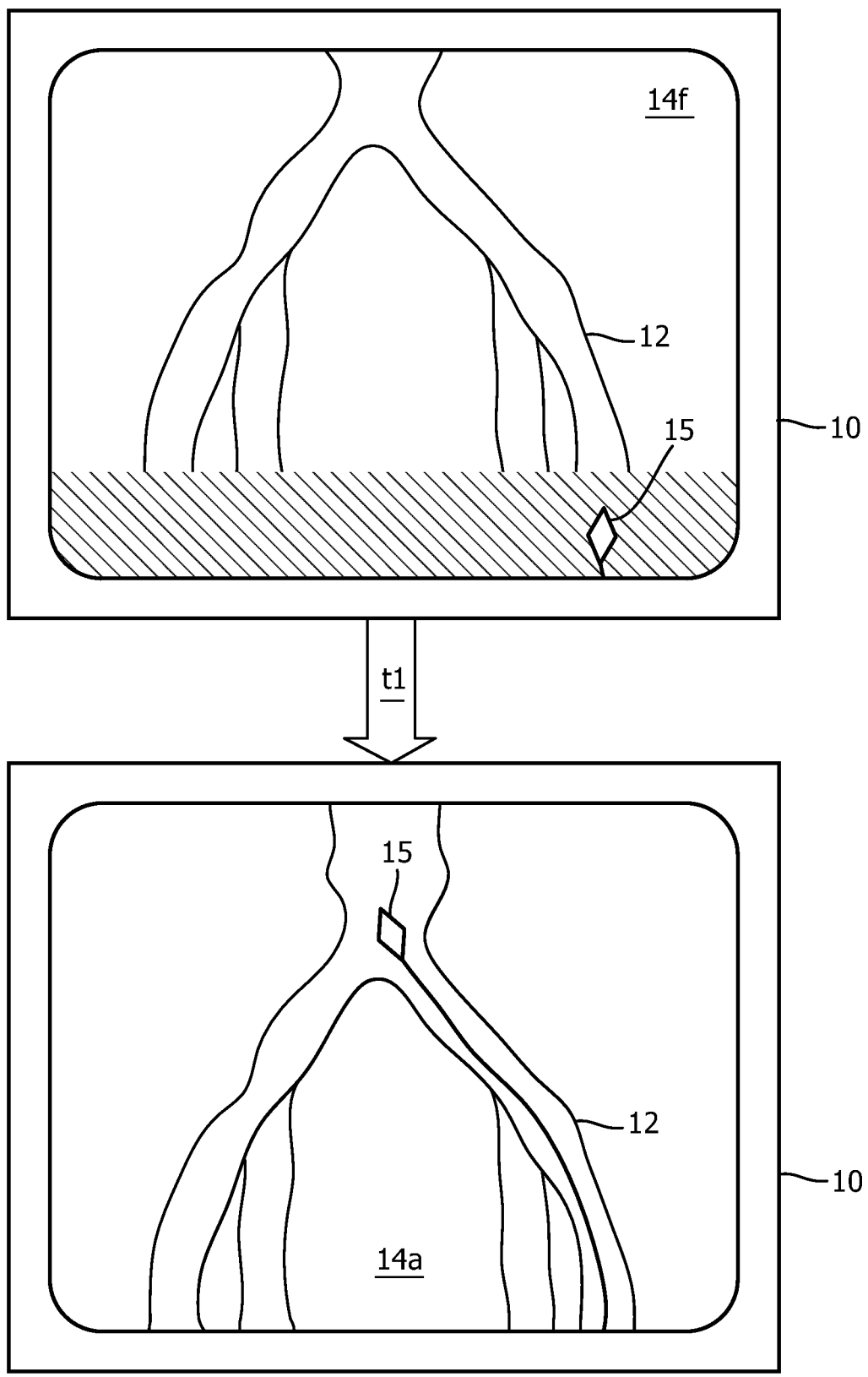
Figure 3E:
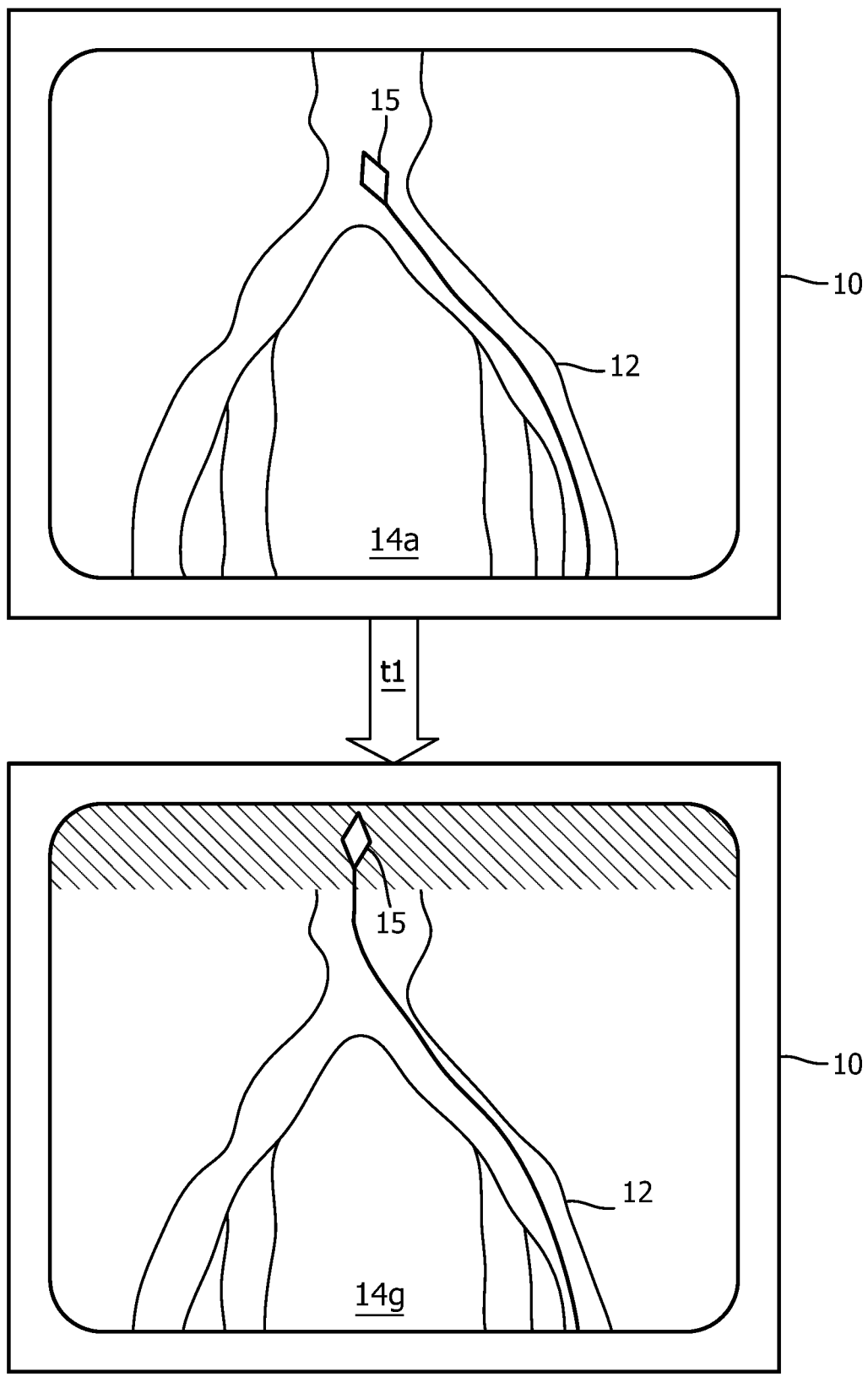

For example, FIG. 3D illustrates an upwardly shifted view 14f of a spatial image 14a when an optical shape sensed position of tracking node 15 of an OSS interventional device is below the image space whereby spatial image 14a is downwardly shifted as tracking node 15 approaches the image space, and FIG. 3E illustrates a downwardly shifted view 14gf of spatial image 14a when an optical shape sensed position of tracking node 15 of an OSS interventional device is above the image space whereby spatial image 14a is downwardly shifted as tracking node 15 leaves the image space.

In a zoom embodiment, a selected spatial image may be displayed in a primary window while a zoomed-in view of tracking node of the interventional device or any non-tracking node of interest of the interventional device may be displayed in a secondary window. A non-tracking node may include, but not be limited to, a node of interventional device experiencing any type of navigational error (e.g., a buckling, undesired bending, or torsion of the interventional device).

Figure 3F:
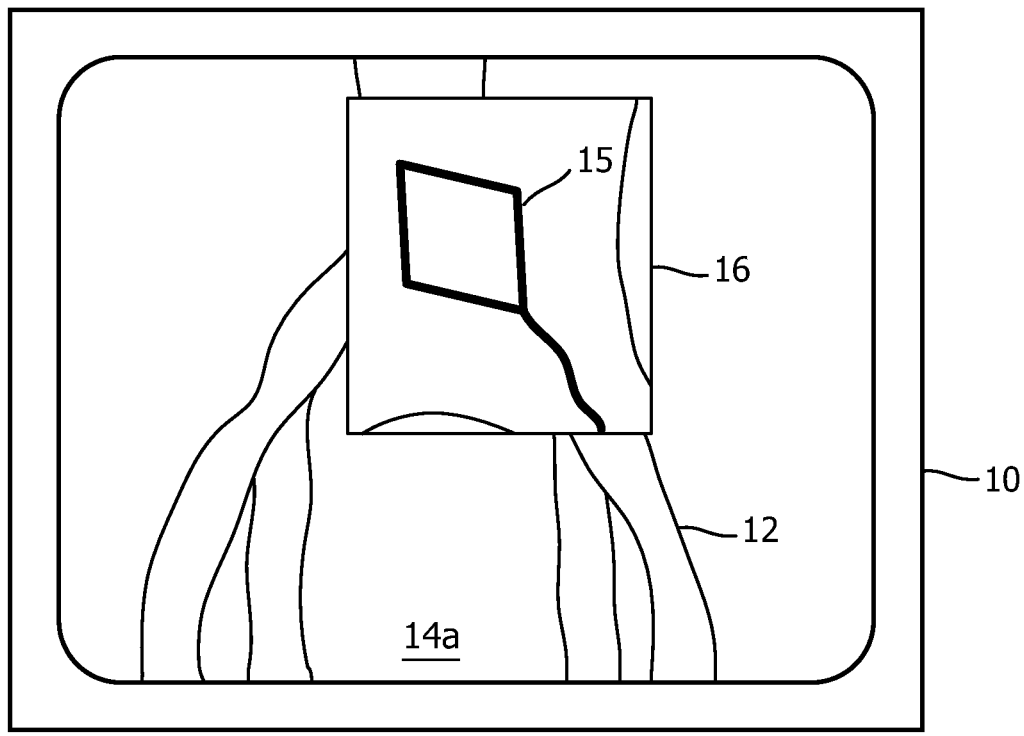

For example, FIG. 3F illustrates a display of spatial image 14a in a primary window of monitor 10 with a display of a zoomed-in view of tracking node 15 in a secondary window 16.

Figure 3G:
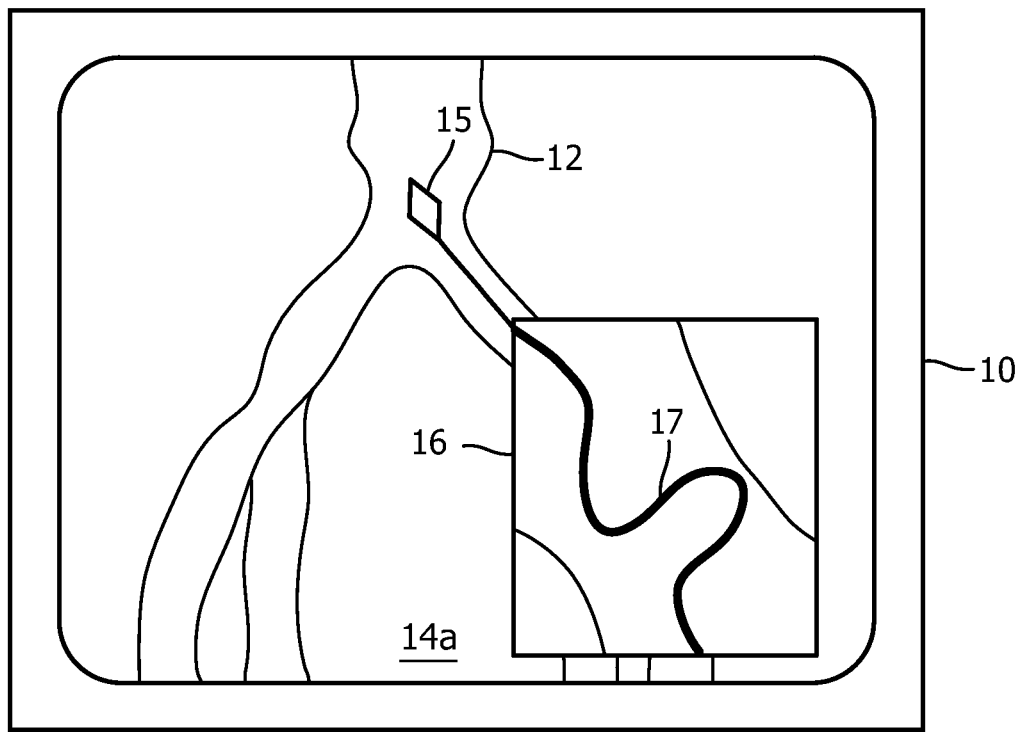

By further example, FIG. 3G illustrates a display of spatial image 14 in a primary window of monitor 10 with a display of a buckling node 17 in secondary window 16.

To facilitate a further understanding of the various inventions of the present disclosure, the following description of FIGS. 4A-6B describes exemplary embodiments of an OSS interventional device. From the description of FIGS. 4A-4B, those having ordinary skill in the art will appreciate how to practice numerous and various embodiments of an OSS interventional device.

Figure 4A:
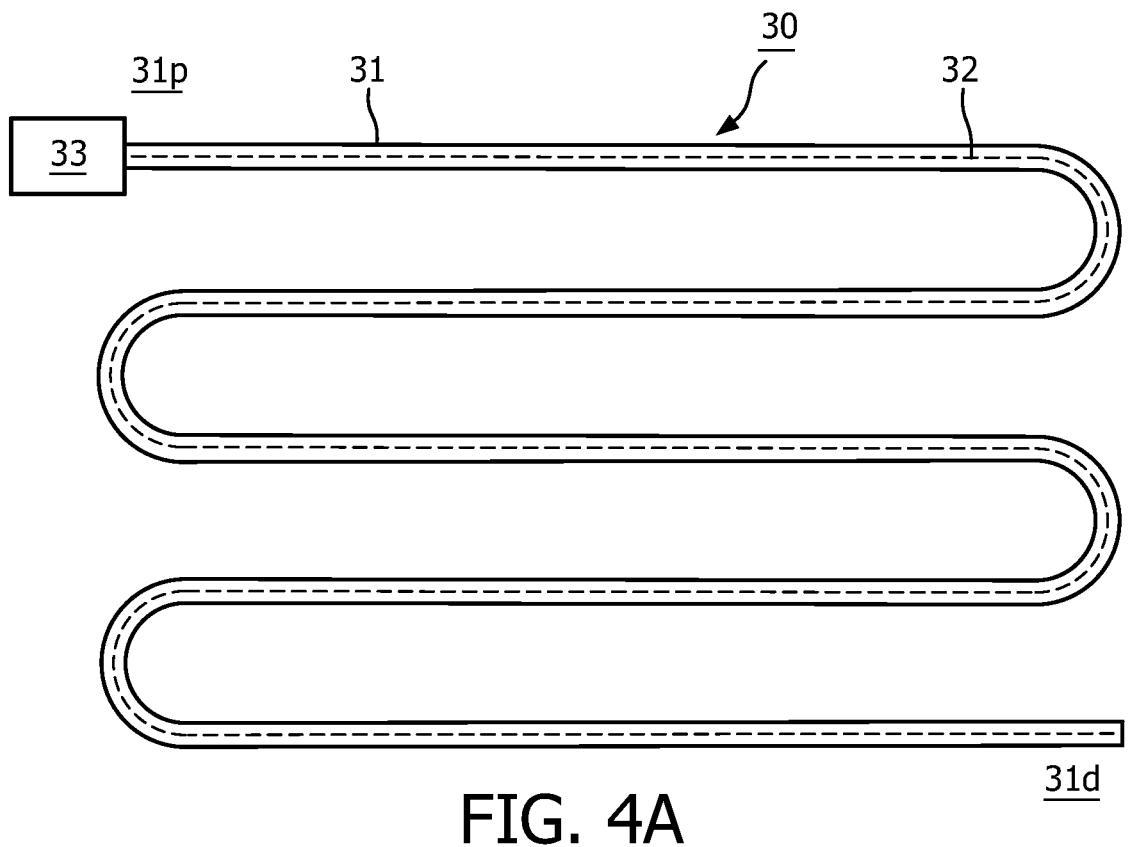
FIGS. 4A-4C illustrates exemplary embodiments of a OSS sensor as known in the art of the present disclosure.
Figure 4B:
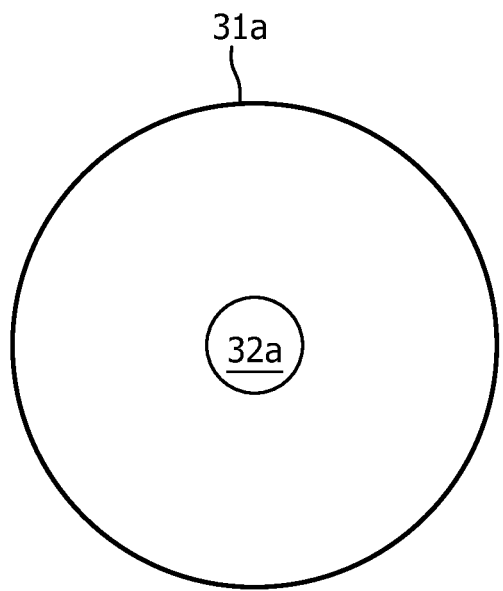
Figure 4C:
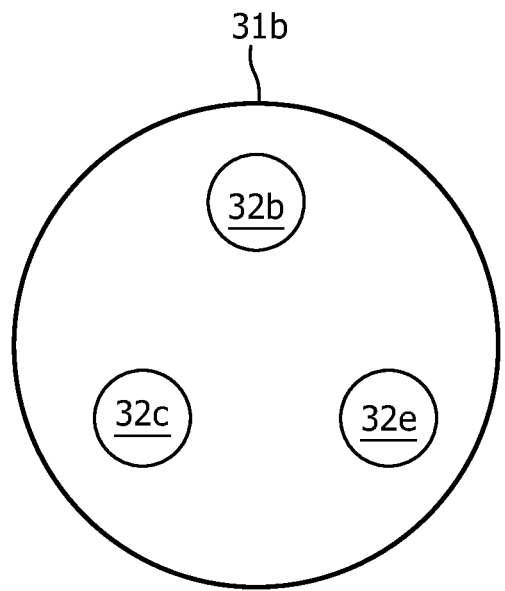

Referring to FIG. 4A, a OSS sensor 30 applicable to the inventions of the present disclosure includes an optical fiber 31 as a single core optical fiber (e.g., a an optical fiber 31a having a single core 32 as shown in FIG. 4B) or a multi-core optical fiber (e.g. a multi-core optical fiber 31b having multi-cores 32b, 32c and 32e as shown in FIG. 4C). A core of optical fiber 31 has controlled grating patterns (e.g., Fiber Bragg Gratings), a characteristic backscatter (e.g., Rayleigh backscatter) or any other arrangement of reflective elements and/or transmissive elements embedded, etched, imprinted, or otherwise formed in optical fiber 31. In practice, OSS nodes in the form of controlled gratings, characteristic backscatter, or reflective/transmissive elements may extend along any segment or an entirety of optical fiber 31 as symbolically shown by dashed line 32 extending from a proximal end 31p (or guidewire proximal end 41p in FIGS. 6A and 6B) to a distal end 31d (or guidewire distal end 41d in FIGS. 6A and 6B). Also in practice, OSS sensor 30 may include two (2) or more individual optical fibers 31 that may or may not be helixed.

In practice, optical fiber 31 of OSS sensor 30 may be made partially or entirely of any glass, silica, phosphate glass or other glasses, or made of glass and plastic or plastic, or other materials used for making optical fibers. For impeding any damage to OSS sensor 30 when introduced into a patient anatomy via manual or robotic insertion, an optical fiber 31 of OSS sensor 30 may permanently encircled by a protective sleeve as known in the art.

In practice, the protective sleeve may be made from any flexible material of a specified hardness including, but not limited to, pebax, nitinol, furcation tubing, and stranded metal tubing. Also in practice, the protective sleeve may consist of two or more tubular components of same or different degrees of flexibility and hardness in an overlapping and/or sequential arrangement.

OSS sensor 30 may further includes an optical connector 33 for connecting optical fiber 31 to another optical fiber, a launch or an optical source (e.g., optical integrator) as will be further described in the present disclosure.

Figure 5:
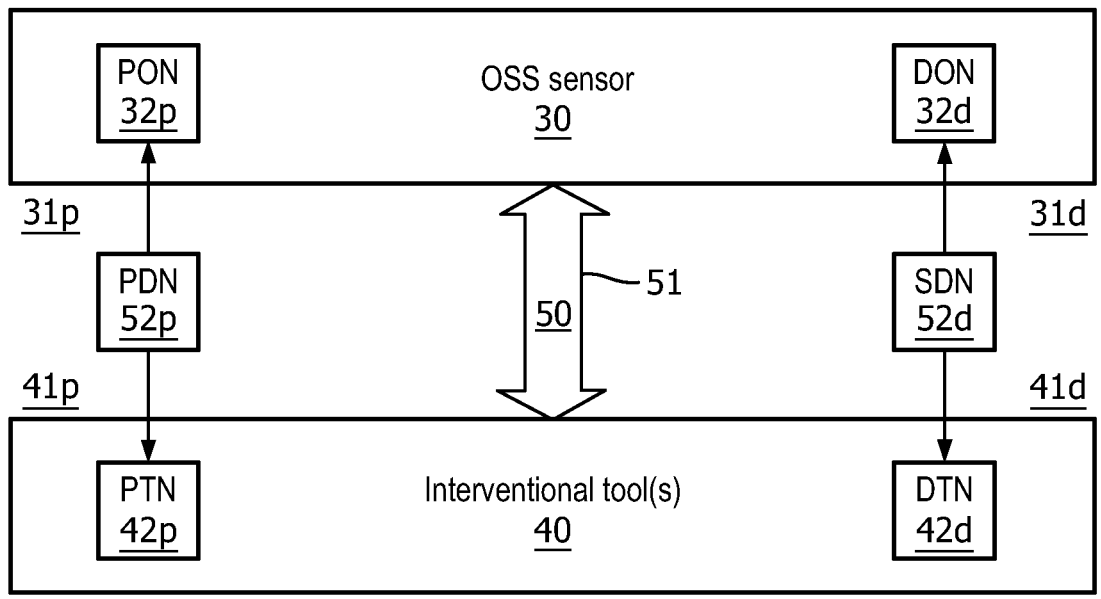
FIG. 5 illustrates an exemplary embodiment of an OSS interventional device as known in the art of the present disclosure.

Referring to FIG. 5, the inventions of the present disclosure provide for an integration 51 of a OSS sensor 30 and one or more interventional tools 40 to configure an OSS interventional device 50 for an execution of an interventional procedure involving a navigation of OSS interventional device 50 within one or more anatomical regions (e.g., a heart and blood vessels of cardiovascular system, airways and lungs of a respiratory system, a stomach and intestines of a digestive system, and bores within of a musculoskeletal system).

Examples of interventional tool 40 include, but are not limited to, vascular interventional tools (e.g., guidewires, catheters, stents sheaths, balloons, atherectomy catheters, IVUS imaging probes, deployment systems, etc.), endoluminal interventional tools (e.g., endoscopes, bronchoscopes, etc.) and orthopedic interventional tools (e.g., k-wires and screwdrivers).

In practice, an integration of OSS sensor 30 and interventional tool 40 may be in any configuration suitable for a particular interventional procedure.

Further in practice, a proximal device node 52p of OSS interventional device 50 may be a proximal OSS node 32p of OSS sensor 30. Alternatively, proximal device node 52p of OSS interventional device 50 may be a proximal tool node 42p mapped to proximal OSS node 32p of OSS sensor 30 via a mechanical relationship mapping or a shape template based mapping between proximal OSS node 32p and proximal tool node 42p as known in the art of the present disclosure.

Similarly in practice, a distal device node 52d of OSS interventional device 50 may be a distal OSS node 32d of OSS sensor 30. Alternatively, distal device node 52d of OSS interventional device 50 may be a distal tool node 42d mapped to distal OSS node 32d of OSS sensor 30 via a mechanical relationship mapping or a shape template based mapping between distal OSS node 32d and distal tool node 42d as known in the art of the present disclosure.

Figure 6A:
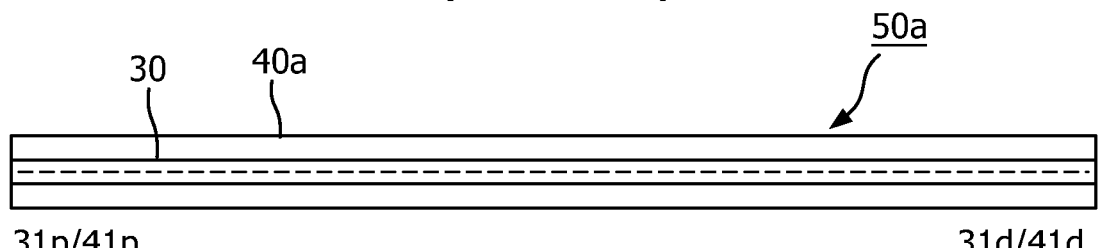
FIGS. 6A and 6B illustrate exemplary embodiments of an integration of a OSS sensor into a guidewire as known in the art of the present disclosure.

For example, FIG. 6A illustrates a OSS sensor 30 axially embedded within a guidewire 40a to configure an OSS interventional device 50 in the form of a OSS guidewire 50a as known in the art of the present disclosure. OSS guidewire 50a may be incorporated into any interventional procedure involving the utilization of a guidewire whereby the OSS guidewire 50a may be navigated as necessary within anatomical region via a shape reconstruction capabilities of OSS sensor 30 as known in the art of the present disclosure.

A proximal device node 52p of OSS interventional device 50a may be a proximal OSS node 32p of OSS sensor 30. Alternatively, proximal device node 52p of OSS interventional device 50a may be a proximal tool node 42p mapped to proximal OSS node 32p of OSS sensor 30 via a mechanical relationship mapping or a shape template based mapping between proximal OSS node 32p and proximal tool node 42p as known in the art of the present disclosure.

A distal device node 52d of OSS interventional device 50a may be a distal OSS node 32d of OSS sensor 30. Alternatively, distal device node 52d of OSS interventional device 50a may be a distal tool node 42d mapped to distal OSS node 32d of OSS sensor 30 via a mechanical relationship mapping or a shape template based mapping between distal OSS node 32d and distal tool node 42d as known in the art of the present disclosure.

Figure 6B:
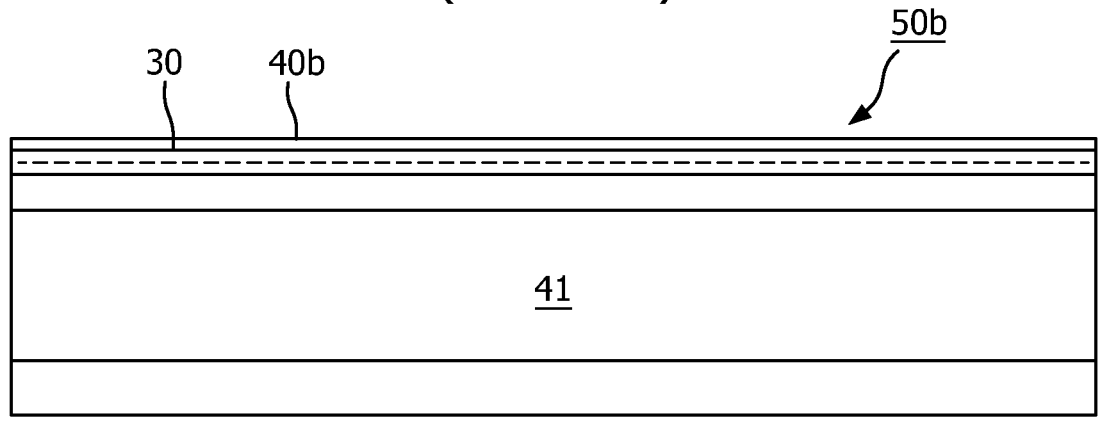

By further example, FIG. 6B illustrates a OSS sensor 30 as shown or a OSS guidewire 50a may be temporarily or permanently inserted within a channel of a catheter 40b to configure an OSS interventional device 50 in the form of a universal catheter 50b as known in the art of the present disclosure. Universal catheter 50b may be incorporated into any interventional procedure involving the utilization of a working channel 41 of catheter 40b whereby universal catheter 40b may be navigated as necessary within anatomical region(s) via a shape reconstruction capabilities of OSS sensor 30 as known in the art of the present disclosure.

A proximal device node 52p of OSS interventional device 50b may be a proximal OSS node 32p of OSS sensor 30. Alternatively, proximal device node 52p of OSS interventional device 50b may be a proximal tool node 42p mapped to proximal OSS node 32p of OSS sensor 30 via a mechanical relationship mapping or a shape template based mapping between proximal OSS node 32p and proximal tool node 42p as known in the art of the present disclosure.

A distal device node 52d of OSS interventional device 50b may be a distal OSS node 32d of OSS sensor 30. Alternatively, distal device node 52d of OSS interventional device 50b may be a distal tool node 42d mapped to distal OSS node 32d of OSS sensor 30 via a mechanical relationship mapping or a shape template based mapping between distal OSS node 32d and distal tool node 42d as known in the art of the present disclosure.

Referring back to FIG. 5, for purposes of the inventions of the present disclosure, a tracking node of OSS interventional device 50 includes any fixed or dynamic point or portion of OSS interventional device 50 between proximal device node 52d and distal device node 52d, or an entirety of OSS interventional device 50.

For example, the tracking node of OSS interventional device 50 may be a distal tip of interventional tool located at distal device node 52d.

By further example, the tracking node of OSS interventional device 50 may be a portion of OSS interventional device 50 between proximal device node 52p and distal device node 52d that is associated with a therapy device (e.g., a balloon or a stent).

By even further example, the tracking node of OSS interventional device 50 may be any portion of OSS interventional device 50 between proximal device node 52p and distal device node 52d that is extending into an anatomical region.

By even further example, the tracking node of OSS interventional device 50 may be any portion of OSS interventional device 50 between proximal device node 52d and distal device node 52d that is positioned in the image space of anatomical region.

Figure 7:
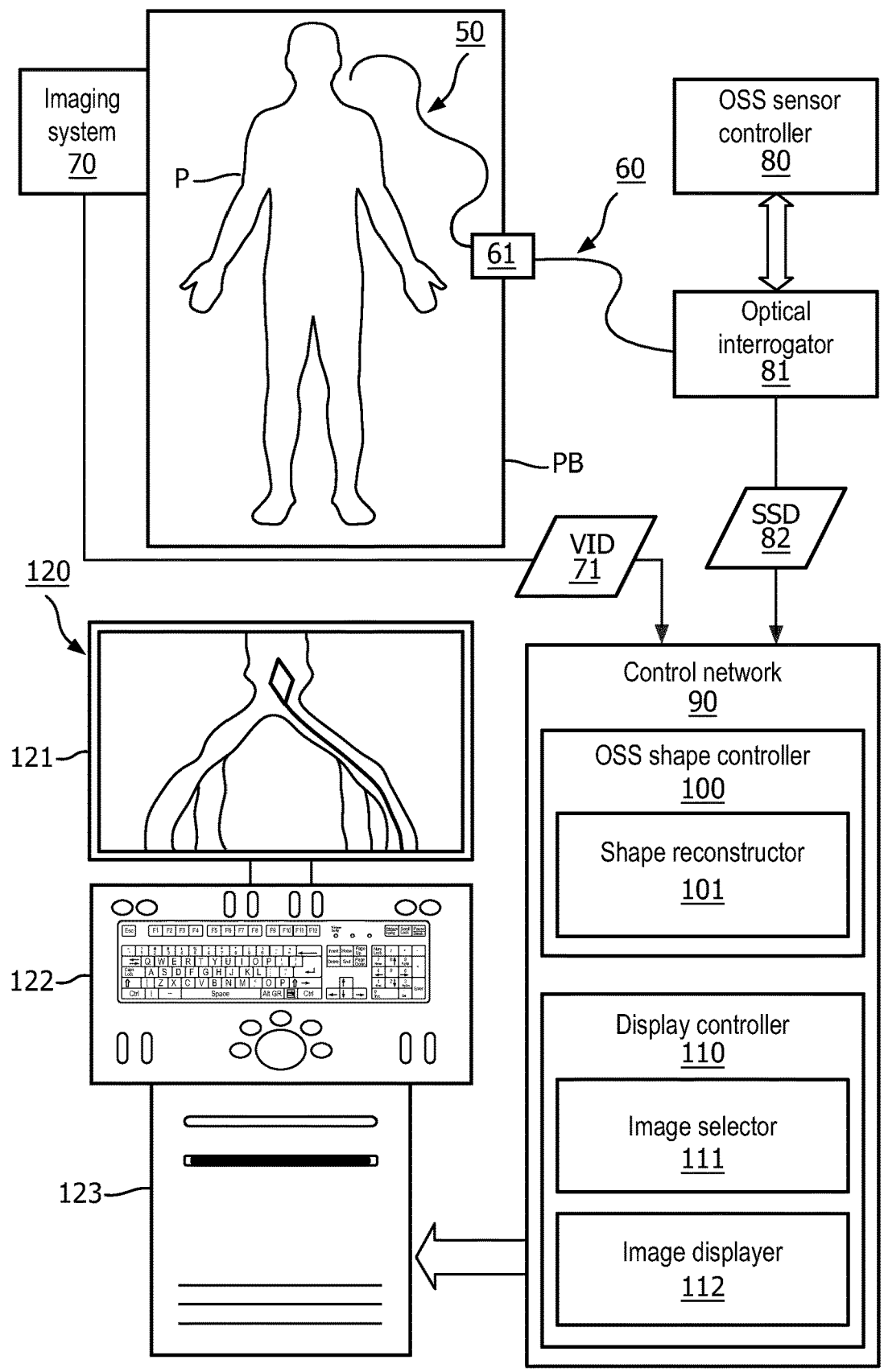
FIG. 7 illustrates an exemplary embodiment of a OSS driven display system in accordance with the inventive principles of the present disclosure.
Figure 8:
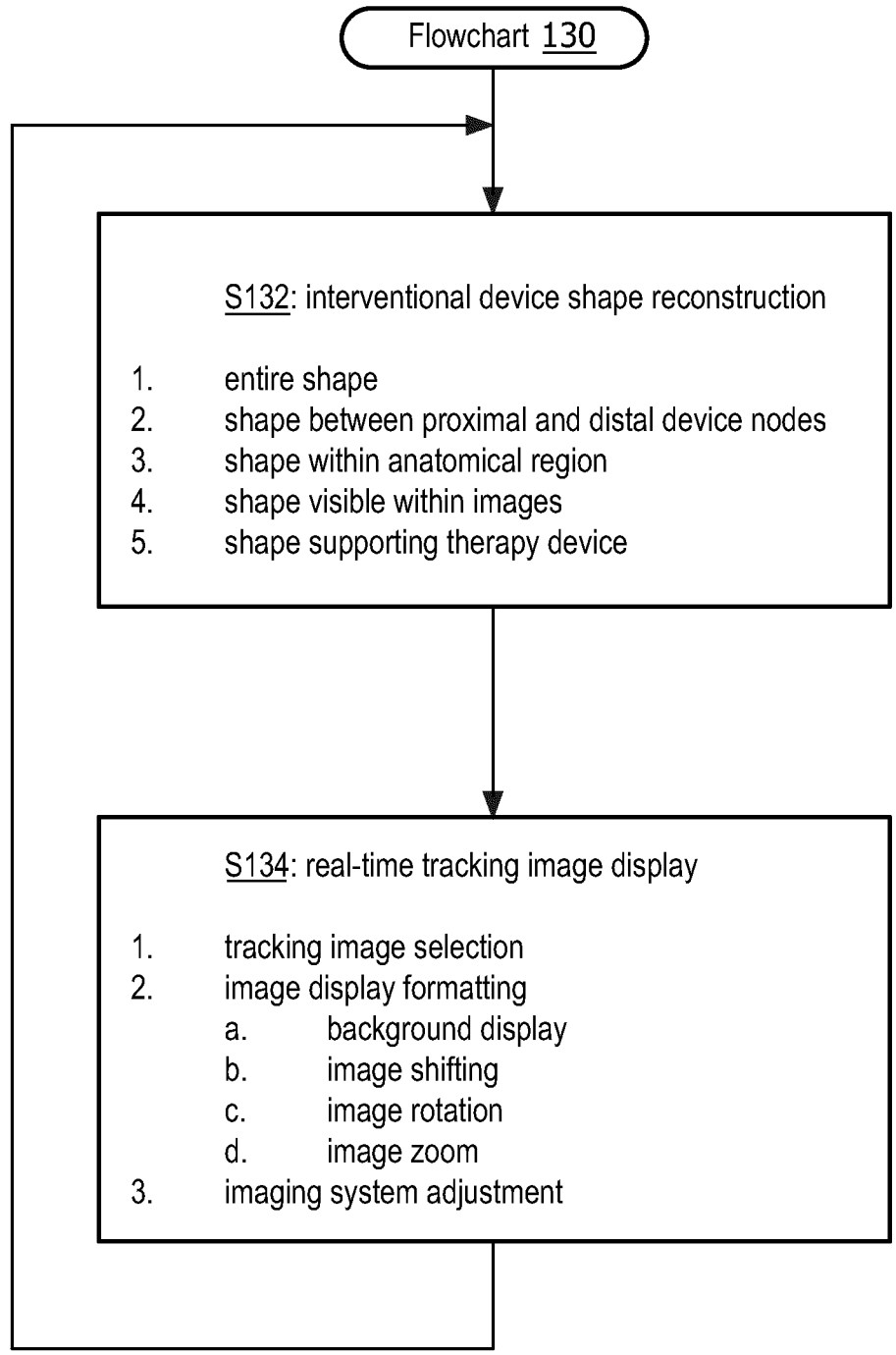
FIG. 8 illustrates an exemplary embodiment of flowchart representative of a OSS driven display in accordance with the inventive principles of the present disclosure.

To facilitate a further understanding of the inventions of the present disclosure, the following description of FIGS. 7 and 8 describes exemplary embodiments of an OSS driven display system and method incorporating the inventive principles of the present disclosure. From the description of FIGS. 7 and 8, those having ordinary skill in the art will appreciate how to apply the inventive principles of the present disclosure to practice numerous and various embodiments of an OSS driven display system and method incorporating the inventive principles of the present disclosure.

Referring to FIG. 7, an OSS driven display system of the present disclosure employs an OSS interventional device 50 (FIG. 5), an imaging system 70 and a control network 90 including a OSS shape controller 100 and a display controller 110 installed on a workstation 120. The OSS interventional system provides an automatic update of a real-time display by workstation 120 of images illustrative of a navigation of the OSS interventional device 50 within an anatomical region of a patient P based on an optically shape sensed position (i.e., a location and/or an orientation) of the OSS interventional device 50 within the anatomical region of patient P in accordance with the inventive principles of the present disclosure previously described in the present disclosure in connection with FIGS. 2A-3G.

In practice, OSS interventional device 50 includes an integration of an OSS sensor 30 and one or more interventional tool(s) 40 as previously described in the present disclosure in connection with FIGS. 4A-6B. For example, OSS interventional device 50 may be OSS guidewire 50*a* (FIG. 6A) or universal catheter 40*b* (FIG. 6A).

In practice, imaging system 70 may implement any type of imaging modality for generating a volume image(s) of anatomical region(s) of patient P (e.g., an X-ray system, a MRI system, a CT system, an ultrasound system, etc.).

In practice, OSS shape controller 100 and display controller 110 may embody any arrangement of hardware, software, firmware and/or electronic circuitry for an automatic update of a real-time display by workstation 120 of images illustrative of a navigation of the OSS interventional device 50 within the anatomical region of patient P in accordance with the inventive principles of the present disclosure.

In one embodiment, OSS shape controller 100 and display controller 110 may include a processor, a memory, a user interface, a network interface, and a storage interconnected via one or more system buses.

The processor may be any hardware device, as known in the art of the present disclosure or hereinafter conceived, capable of executing instructions stored in memory or storage or otherwise processing data. In a non-limiting example, the processor may include a microprocessor, field programmable gate array (FPGA), application-specific integrated circuit (ASIC), or other similar devices.

The memory may include various memories, as known in the art of the present disclosure or hereinafter conceived, including, but not limited to, L1, L2, or L3 cache or system memory. In a non-limiting example, the memory may include static random access memory (SRAM), dynamic RAM (DRAM), flash memory, read only memory (ROM), or other similar memory devices.

The operator interface may include one or more devices, as known in the art of the present disclosure or hereinafter conceived, for enabling communication with a user such as an administrator. In a non-limiting example, the operator interface may include a command line interface or graphical user interface that may be presented to a remote terminal via the network interface.

The network interface may include one or more devices, as known in the art of the present disclosure or hereinafter conceived, for enabling communication with other hardware devices. In a non-limiting example, the network interface may include a network interface card (NIC) configured to communicate according to the Ethernet protocol. Additionally, the network interface may implement a TCP/IP stack for communication according to the TCP/IP protocols. Various alternative or additional hardware or configurations for the network interface will be apparent\

The storage may include one or more machine-readable storage media, as known in the art of the present disclosure or hereinafter conceived, including, but not limited to, read-only memory (ROM), random-access memory (RAM), magnetic disk storage media, optical storage media, flash-memory devices, or similar storage media. In various non-limiting embodiments, the storage may store instructions for execution by the processor or data upon with the processor may operate. For example, the storage may store a base operating system for controlling various basic operations of the hardware. The storage may further store one or more application modules in the form of executable software/firmware.

More particularly, still referring to FIG. 7, an application module of OSS shape controller 100 is a shape reconstructor 101 for reconstructing a portion or an entirety of a shape of interventional tool 40 in response to shape sensing data 82 as known in the art of the present disclosure and further exemplary described in the present disclosure.

Further, application modules of display controller 110 include an image selector 111 for autonomously selecting tracking image among a plurality of spatial images in accordance with the inventive principles of the present disclosure as will be further exemplarily described in the present disclosure, and an image displayer 112 for controlling a display of the selected tracking image in accordance with the inventive principles of the present disclosure as will be further exemplarily described in the present disclosure.

Still referring to FIG. 7, workstation 120 includes a known arrangement of a monitor 121, a keyboard 122 and a computer 123.

In practice, control network 90 may be alternatively or concurrently installed on other types of processing devices including, but not limited to, a tablet or a server accessible by workstations and tablets, or may be distributed across a network supporting an execution of interventional procedures involving OSS interventional device 50.

Also in practice, OSS shape controller 100 and display controller 110 may be integrated components, segregated components or logically partitioned components of control network 90.

Still referring to FIG. 7, in operation, imaging system 70 pre-operatively and/or intra-operatively generates volume image data 71 for displaying a volume image of the subject anatomical region(s) of patient P. Volume image data 71 is communicated to control network 90 (e.g., a streaming or an uploading of volume image data 71) whereby image displayer 112 may control an overlay display of a reconstructed shape of OSS interventional device 50 on the volume image of anatomical region(s) of patient P as known in the art of the present disclosure. For example, FIG. 7 illustrates an overlay display on monitor 121 of a reconstructed shape of OSS interventional device 50 on a volume image of a vascular structure of patient P.

OSS interventional device 50 distally extends from a launch 61 adjoined to a rail of patient bed PB as shown, or alternatively adjoined to a cart (not shown) next to patient bed PB or alternatively adjoined to a workstation (e.g., workstation 100 or a tablet (not shown)). An optical fiber 60 proximally extends from launch 61 to an optical integrator 81. In practice, optical fiber 60 may be a separate optical fiber connected to OSS sensor 30 of OSS interventional device 50 at launch 61, or a proximal extension of OSS sensor 30 extending through launch 61.

As known in the art of the present disclosure, a OSS sensor controller 80 controls a cyclical emission of light by optical interrogator 81 via optical fiber 50 into OSS sensor 30 whereby the light is propagated through OSS sensor 30 to a distal tip of OSS interventional device 50 to thereby generate shape sensing data 82 informative of a shape of OSS interventional device 50 relative to launch 61 serving as a fixed reference position. In practice, the distal end of OSS sensor 30 may be closed, particularly for light reflective embodiments of OSS sensor 30, or may be opened, particularly for light transmissive embodiments of OSS sensor 30.

Shape sensing data 82 serves as position tracking data whereby OSS sensor controller 80 controls a communication of a temporal frame sequence of shape sensing data 82 to OSS shape controller 100 as known in the art of the present disclosure. More particularly, each frame consists of a single interrogation cycle of the strain sensors of OSS sensor 30 (e.g., Fiber Bragg Gratings or Rayleigh backscatter) whereby shape reconstructor 101 reconstructs a shape of OSS sensor 30 on a temporal frame basis as known in the art of the present disclosure, which provides for a reconstruction of a portion or an entirety of the shape of OSS interventional device 50 derived from the particular integration of OSS sensor 30 and interventional tool(s) 40.

In practice, shape reconstructor 101 may implement any reconstruction technique for reconstructing the portion/entirety of a shape of OSS interventional device 50 as known in the art of the present disclosure.

In one reconstruction embodiment, shape reconstructor 101 executes a delineation of pose of the portion/entirety of a shape of OSS interventional device 50 via shape sensing data 82 on a temporal frame basis within a coordinate system corresponding to optical interrogator 81.

In a second reconstruction embodiment, shape reconstructor 101 executes a registration of a coordinate system of optical interrogator 81 to a coordinate system of imaging system 70 whereby shape reconstructor 101 may position and orientate a delineation of the portion/entirety of a shape of OSS interventional device 50 via shape sensing data 82 on a temporal frame basis within the coordinate system of imaging system 70.

FIG. 8 illustrates a flowchart 130 representative of an OSS driven display method of the present disclosure that is implemented by the OSS driven display system of FIG. 7.

Prior to or during an execution of flowchart 130, the spatial images are individually registered to a three-dimensional (3D) shape of OSS sensor 30 (FIG. 5) within OSS interventional device 50 by OSS shape controller 100 or display controller 110.

In one embodiment, a 3D shape of OSS sensor 30 is registered to the image space of the spatial images to thereby generate an individual registration matrix for each spatial image. OSS sensor 30 may utilize any spatial registration method suitable for the subject medical procedure, including, for example, object feature detection, marker detection, point based registration, or external tracking methods.

Referring to FIGS. 7 and 8, a stage S132 of flowchart 130 encompasses shape reconstructor 101 reconstructing a portion or an entirety of a shape of OSS interventional device 50 in response to shape sensing data 82 as known in the art of the present disclosure.

In one exemplary embodiment, shape reconstructor 101 may reconstruct an entire shape of OSS interventional device 50 between proximal device node 52p and distal device node 52d.

In a second exemplary embodiment, shape reconstructor 101 may reconstruct a portion of OSS interventional device 50 between proximal device node 52p and distal device node 52d.

In a third exemplary embodiment, shape reconstructor 101 may reconstruct a portion of the OSS interventional device 50 between an intermediate device node and a distal device node 52d with intermediate device node being identified as the node at the entry point of an anatomical region AR as known in the art of the present disclosure.

In a fourth exemplary embodiment, shape reconstructor 101 may reconstruct a portion of the OSS interventional device 50 between an intermediate device node and a distal device node 52d with intermediate device node being identified as the node at the entry point of an image space of the registered spatial images.

In a fifth exemplary embodiment, shape reconstructor 101 may reconstruct a portion of the OSS interventional device 50 between a proximal tool node 42p and a distal tool node 42d enclosing a therapy device (e.g., a balloon, a stent, an endograft, etc.).

Referring back to FIGS. 7 and 8, a stage S134 of flowchart 130 encompasses a real-time display of a tracking image selected among the registered spatial images.

Tracking Image Selection. The spatial images with their respective registration matrices are saved in a database whereby image selector 111 may implement an image selection scheme of the present disclosure based on a position of a tracking node of OSS interventional device 50 relative to the image space of the registered spatial images to thereby.

More particularly, for an initial execution of stage S134, image selector 111 processes shape sensing data 82 to thereby register a shape of OSS sensor 30 to each spatial image via the individual registration matrixes to ascertain a XYZ location and/or an αβγ orientation of the tracking node of interventional device relative to each spatial image. As previously described in the present, image selector 111 will select the registered spatial image for display by image displayer 112 that best corresponds to the XYZ location and/or the αβγ orientation of the tracking node of interventional device.

For each subsequent execution of stage S134, image selector 111 re-registers a shape of OSS sensor 30 to each spatial image via the individual registration matrixes to ascertain a XYZ location and/or an αβγ orientation of the tracking node of interventional device relative to each spatial image to thereby select the registered spatial image for display that best corresponds to the XYZ location and/or the αβγ orientation of the tracking node of interventional device. As such, as OSS interventional device 50 is navigated within the anatomical region, a registered spatial image being currently displayed by image displayer 112 may be replaced by a newly selected registered spatial image.

For example, if shape sensing data 82 indicates a XYZ location of the tracking node of OSS interventional device 50 has moved beyond the boundary of a registered spatial image currently being displayed into an adjacent registered spatial image, then image selector 111 will select the adjacent registered spatial image as a replacement image for display by image displayer 112.

By further example, if shape sensing data 82 indicates an αβγ orientation of the tracking node of OSS interventional device 50 has changed direction within the registered spatial image currently being displayed, then image selector 111 may select an adjacent registered spatial image as a replacement image for display for image displayer 112 that is best suited for viewing the αβγ orientation of the tracking node of OSS interventional device 50.

Image Display Formatting. For the initial execution of stage S134, if image selector 111 determines the tracking node of OSS interventional device 50 is external to the imaging space of the registered spatial images, then image displayer 112 will control a display of the tracking node within a background (e.g., a plain background) illustrating an overlay of the tracking node of OSS interventional device 50.

As the tracking node of OSS interventional device 50 approaches the boundary of the image space of registered spatial images, then image displayer 112 displays a shifting of the overlay of the tracking node of OSS interventional device 50 and/or a currently selected registered spatial image by image selector 111 toward each other, such as, for example as previously described in the present disclosure in connection with FIG. 3D.

Prior to or upon the tracking node of OSS interventional device 50 being fully within a boundary of a currently selected registered spatial image by image selector 111, image displayer 112 may execute an image rotation of the currently selected registered spatial image as previously described in the present disclosure in connection with FIG. 3C and/or an image zoom of a tracking node or a non-tracking node of the OSS interventional device 50 as previously described in the present disclosure in connection with FIGS. 3F and 3G.

More particular to image rotation, the currently selected registered spatial image by image selector 111 is rotated by image displayer 112 as needed to best show the anatomical context of the navigation of the tracking node of OSS interventional device 50 within the anatomical region. To this end, image displayer 112 may process rotational information including, but not limited to, a αβγ rotation of a tip of OSS interventional device 50, a shape rotation/template of any portion of OSS interventional device 50, and/or a rotation of a therapy device of OSS interventional device 50 to thereby ascertain the best viewing angle of the currently selected registered spatial image by image selector 111.

More particular to image zoom, an area of interest of OSS interventional device 50 may be chosen by clicking on any node along the shape OSS interventional device 50 or by selecting from a list of predetermined locations (e.g., catheter tip, guidewire tip, therapy device fiducial). The default primary image window will show the currently selected registered spatial image and a mechanical or software button may be pushed in order to toggle to a zoomed image window of the preselected area of interest of OSS interventional device 50 during the procedure.

Image displayer 112 will align the zoomed secondary window to overlay a zoomed-in image of the preselected area of interest of OSS interventional device 50 based on the current XYZ location of the preselected area of interest and the size of both the primary and zoomed image windows. Alternatively, image displayer 112 may set the zoomed image window to appear in a different location.

Image displayer 112 may move the zoomed image window with the OSS interventional device 50 whereby the zoomed image window overlay remains centered on the preselected area of interest of the primary image window. The zoomed image window may remain on the display until the user pushes the button again to return to the primary image window only, or the zoomed image window may be displayed until OSS interventional device 50 leaves the zoomed region, in which case the image reverts to the primary image window only.

Alternatively, image displayer 112 may only display the zoomed image window when relevant in the context of the procedure. For instance, the zoomed image window may be displayed when navigation difficulty is detected via buckling, torqueing, etc., when the devices reaches an area of interest, and when deployment of a therapy device commences (e.g., balloon inflation, endograft/stent expansion).

Region of interest zooming can also be applied to locations outside of the current view. For example, if it is determined by shape recontructor 101 from the shape sensing data 82 that there has been a navigational error inside or outside of the primary viewing widow (e.g., buckling, torqueing, or undesired bending), then a secondary zoomed window may appear showing the location at which the error occurred and can continue to track this region of the image until the error has cleared. The secondary zoomed window may also be used to display an alternative imaging plane, such as a 'fly-through' image, which can be automatically updated based on the position of the tracking node of OSS interventional device 50 relative to the image space.

Additionally, the tracking node of OSS interventional device 50 may exit the image space of the registered spatial images. If this occurs, then image displayer 112 will shift the currently selected registered spatial image as needed while maintaining a view of the tracking node of OSS interventional device 50 within a background (e.g., a plain background), such as, for example as previously described in the present disclosure in connection with FIG. 3E. Furthermore, image displayer 112 may provide a new image acquisition window enclosing the tracking node of OSS interventional device 50 to thereby facilitate an acquisition of additional spatial image(s).

Imaging System Adjustment. A position of the tracking node of the interventional device relative to the image space may also be used to automatically adjust a field of view of imaging system 70. For example with imaging system 70 being an X-ray system, image displayer 112 automatically moves the C-arm to thereby follow the navigation of OSS interventional device 50 within the anatomical region, always keeping the tracking node at the center of the X-ray detector. Image displayer 112 may communicate commands directly to the C-arm for both a position of the X-ray detector and a rotation around the patient P. The current shape sending data 82 (e.g., location and orientation) along with pre-operative reconstructed 3D models of the patient anatomy can be used to determine the optimal angle for the X-ray detector to be positioned at to view both the OSS interventional device 50 as well an anatomical area of interest. Therefore, if an acquisition of additional spatial image(s) are required, the C-arm is already in position and ready to acquire such spatial image(s).

This technique also applies to other imaging modalities. For example, if imaging system 70 employs an external ultrasound probe, then image displayer 112 may control an automatic movement of the probe to follow the shape-sensed OSS interventional device 50 so OSS interventional device 50 is always within the field of view of the probe for the acquisition of any additional spatial image(s).

Stages S132 and S134 are repeated during the interventional procedure whereby a spatial image may be replaced, shifted, rotated and zoomed as needed to facilitate an optimal viewing of the interventional procedure.

Referring to FIGS. 9 and 10, the inventions of the present disclosure provides for additional forms of position tracking driven systems and methods.

Figure 9A:
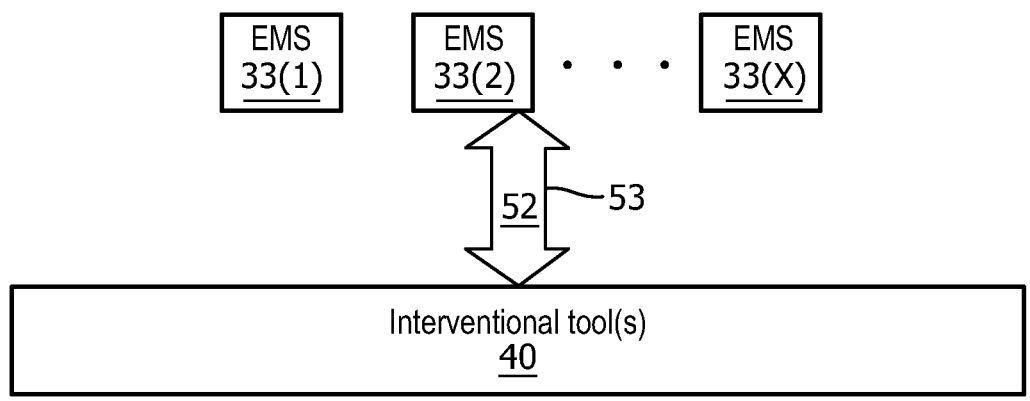
FIG. 9A illustrates an exemplary embodiment of an EM sensed interventional device as known in the art of the present disclosure.

In an EM embodiment, referring to FIG. 9A, the inventions of the present disclosure provide for an integration 53 of an X number of EM sensors 33, X≥1 and one or more interventional tools 40 to configure an EM sensed interventional device 52 for an execution of an interventional procedure involving a navigation of EM sensed interventional device 52 within one or more anatomical regions (e.g., a heart and blood vessels of cardiovascular system, airways and lungs of a respiratory system, a stomach and intestines of a digestive system, and bores within a musculoskeletal system).

Again, examples of interventional tool 40 include, but are not limited to, vascular interventional tools (e.g., guidewires, catheters, stents sheaths, balloons, atherectomy catheters, IVUS imaging probes, deployment systems, etc.), endoluminal interventional tools (e.g., endoscopes, bronchoscopes, etc.) and orthopedic interventional tools (e.g., k-wires and screwdrivers).

In practice, an integration 53 of EM sensor(s) 33 and interventional tool(s) 40 may be in any configuration suitable for a particular interventional procedure. More particularly, EM sensor(s) 33 are disposed within an interventional tool 40 to delineate one or more tracking nodes of interventional device 52.

Figure 9B:
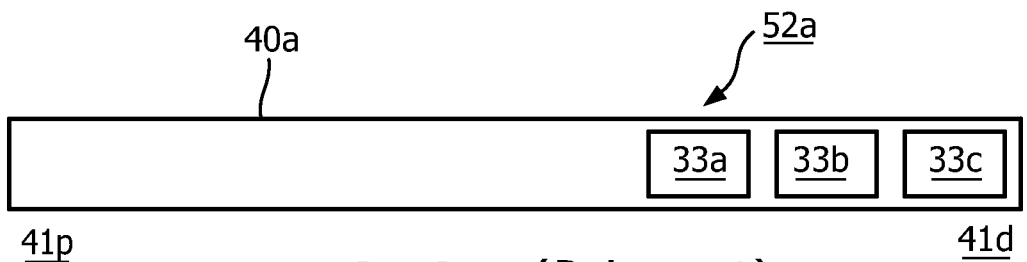
FIG. 9B illustrates exemplary embodiments of an integration of EM sensor(s) into a guidewire as known in the art of the present disclosure.

For example, FIG. 9B illustrates three (3) EM sensors 33a, 33b and 33c axially embedded within a guidewire 40a to configure an EM sensed interventional device 52 in the form of an EM sensed guidewire 52a as known in the art of the present disclosure. EM sensed guidewire 52a may be incorporated into any interventional procedure involving the utilization of a guidewire whereby the EM sensed guidewire 52a may be navigated as necessary within anatomical region via an electromagnetic field sensing of EM sensors 33 as known in the art of the present disclosure.

For this example, EM sensors 33a, 33b and 33c are disposed in the distal end 41d of guidewire 40a to delineate a distal tracking node of interventional device 52a.

Referring to FIGS. 7 and 8, a EM driven display system and method of the present disclosure involves a substitution of an EM sensed interventional device 52 for OSS interventional device 50 whereby an added EM field generator induces the generation of position tracking data in the form of EM sensing data informative of a position of the tracking node of the EM sensed interventional device 52 as known in the art of the present disclosure.

Figure 10A:
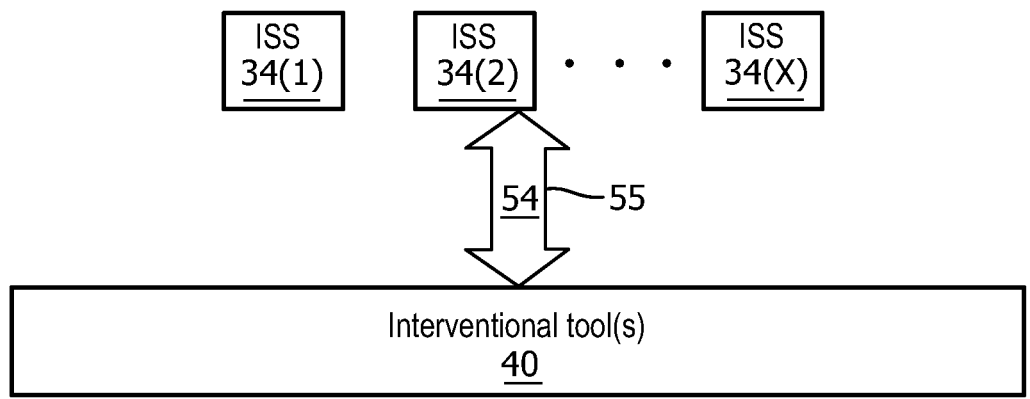
FIG. 10A illustrates an exemplary embodiment of an InSitu sensed interventional device as known in the art of the present disclosure.

In an InSitu embodiment, referring to FIG. 10A, the inventions of the present disclosure provide for an integration 55 of an X number of InSitu sensors 34 (e.g., ultrasound sensors), X≥1 and one or more interventional tools 40 to configure an InSitu sensed interventional device 54 for an execution of an interventional procedure involving a navigation of InSitu sensed interventional device 54 within one or more anatomical regions (e.g., a heart and blood vessels of cardiovascular system, airways and lungs of a respiratory system, a stomach and intestines of a digestive system, and bores within a musculoskeletal system).

Again, examples of interventional tool 40 include, but are not limited to, vascular interventional tools (e.g., guidewires, catheters, stents sheaths, balloons, atherectomy catheters, IVUS imaging probes, deployment systems, etc.), endoluminal interventional tools (e.g., endoscopes, bronchoscopes, etc.) and orthopedic interventional tools (e.g., k-wires and screwdrivers).

In practice, an integration 55 of InSitu sensor(s) 34 and interventional tool(s) 40 may be in any configuration suitable for a particular interventional procedure. More particularly, InSitu sensor(s) 34 are disposed within an interventional tool 40 to delineate one or more tracking nodes of interventional device 54.

Figure 10B:
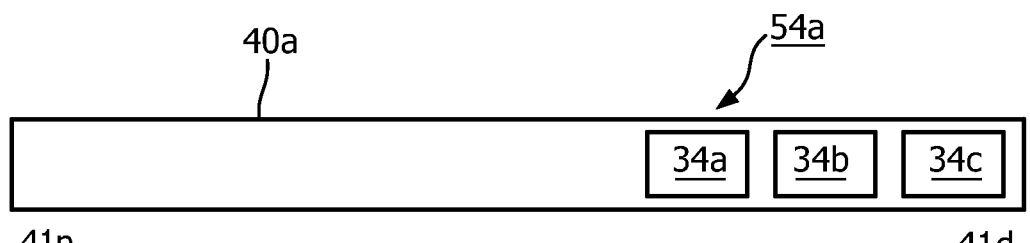
FIG. 10B illustrates exemplary embodiments of an integration of InSitu sensor(s) into a guidewire as known in the art of the present disclosure.

For example, FIG. 10B illustrates three (3) InSitu sensors 34a, 34b and 34c axially embedded within a guidewire 40a to configure an InSitu sensed interventional device 54 in the form of an InSitu sensed guidewire 54a as known in the art of the present disclosure. InSitu sensed guidewire 54a may be incorporated into any interventional procedure involving the utilization of a guidewire whereby the InSitu sensed guidewire 54a may be navigated as necessary within anatomical region via an imaging energy sensing by InSitu sensors 34 as known in the art of the present disclosure.

For this example, InSitu sensors 34a, 34b and 34c are disposed in the distal end 41d of guidewire 40a to delineate a distal tracking node of interventional device 54a.

Referring to FIGS. 7 and 8, a InSitu driven display system and method of the present disclosure involves a substitution of an InSitu sensed interventional device 54 for OSS interventional device 50 whereby an imaging device (e.g., an ultrasound probe) of imaging system 70 or in addition to imaging system 70 induces a generation of position tracking data in the form of InSitu sensing data informative of a position of the tracking node of the InSitu sensed interventional device 54 as known in the art of the present disclosure.

Referring to FIGS. 1-10, those having ordinary skill in the art will appreciate numerous benefits of the present disclosure including, but not limited to, an improvement over prior system, controllers and methods for implementing an interventional procedure by providing an automatic update of a real-time display of images illustrative of a navigation of the interventional device within the anatomical region based on position tracking technology information of a position (i.e., a location and/or an orientation) of the interventional device within the anatomical region.

Furthermore, as one having ordinary skill in the art will appreciate in view of the teachings provided herein, features, elements, components, etc. described in the present disclosure/specification and/or depicted in the Figures may be implemented in various combinations of electronic components/circuitry, hardware, executable software and executable firmware and provide functions which may be combined in a single element or multiple elements. For example, the functions of the various features, elements, components, etc. shown/illustrated/depicted in the Figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared and/or multiplexed. Moreover, explicit use of the term "processor" should not be construed to refer exclusively to hardware capable of executing software, and can implicitly include, without limitation, digital signal processor ("DSP") hardware, memory (e.g., read only memory ("ROM") for storing software, random access memory ("RAM"), non-volatile storage, etc.) and virtually any means and/or machine (including hardware, software, firmware, circuitry, combinations thereof, etc.) which is capable of (and/or configurable) to perform and/or control a process.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (e.g., any elements developed that can perform the same or substantially similar function, regardless of structure). Thus, for example, it will be appreciated by one having ordinary skill in the art in view of the teachings provided herein that any block diagrams presented herein can represent conceptual views of illustrative system components and/or circuitry embodying the inventive principles of the invention. Similarly, one having ordinary skill in the art should appreciate in view of the teachings provided herein that any flow charts, flow diagrams and the like can represent various processes which can be substantially represented in computer readable storage media and so executed by a computer, processor or other device with processing capabilities, whether or not such computer or processor is explicitly shown.

Furthermore, exemplary embodiments of the present disclosure can take the form of a computer program product or application module accessible from a computer-usable and/or computer-readable storage medium providing program code and/or instructions for use by or in connection with, e.g., a computer or any instruction execution system. In accordance with the present disclosure, a computer-usable or computer readable storage medium can be any apparatus that can, e.g., include, store, communicate, propagate or transport the program for use by or in connection with the instruction execution system, apparatus or device. Such exemplary medium can be, e.g., an electronic, magnetic, optical, electromagnetic, infrared or semiconductor system (or apparatus or device) or a propagation medium. Examples of a computer-readable medium include, e.g., a semiconductor or solid state memory, magnetic tape, a removable computer diskette, a random access memory (RAM), a read-only memory (ROM), flash (drive), a rigid magnetic disk and an optical disk. Current examples of optical disks include compact disk-read only memory (CD-ROM), compact disk-read/write (CD-R/W) and DVD. Further, it should be understood that any new computer-readable medium which may hereafter be developed should also be considered as computer-readable medium as may be used or referred to in accordance with exemplary embodiments of the present disclosure and disclosure.

Having described preferred and exemplary embodiments of novel and inventive position tracking drive display systems, controllers and methods, (which embodiments are intended to be illustrative and not limiting), it is noted that modifications and variations can be made by persons having ordinary skill in the art in light of the teachings provided herein, including the Figures. It is therefore to be understood that changes can be made in/to the preferred and exemplary embodiments of the present disclosure which are within the scope of the embodiments disclosed herein.

Moreover, it is contemplated that corresponding and/or related systems incorporating and/or implementing the device or such as may be used/implemented in a device in accordance with the present disclosure are also contemplated and considered to be within the scope of the present disclosure. Further, corresponding and/or related method for manufacturing and/or using a device and/or system in accordance with the present disclosure are also contemplated and considered to be within the scope of the present disclosure.

The invention claimed is:

1. An optical shape sensing (OSS) sensor driven display system for display of an interventional device including an integration of an OSS sensor and at least one interventional tool, the OSS sensor driven display system comprising:
a monitor; and
at least one controller for controlling a real-time display on the monitor of a tracking image illustrative of a navigation of a tracking node of the interventional device within an anatomical region during a minimally invasive procedure, wherein the at least one controller is configured to:
receive a plurality of series of spatial images in an image space of a volume image of the anatomical region acquired by an imaging system, wherein the plurality of series of spatial images are along a plurality of different axial directions, respectively, wherein each series of spatial images is illustrative of the anatomical region in the image space;
register the OSS sensor to each spatial image in the plurality of series of spatial images based on position tracking data informative of a position of the OSS sensor within the anatomical region in the image space;
identify a registered spatial image in each series of spatial images showing the tracking node of the interventional device;
ascertain a location and an orientation of the tracking node in each identified spatial image;
autonomously select the tracking image for the real-time display on the monitor as the identified spatial image that includes the location and the orientation of the tracking node of the interventional device;
when the position tracking data indicates the orientation of the tracking node has changed direction, autonomously select the tracking image as another spatial image in the changed direction from the identified spatial image to replace the tracking image for the real-time display on the monitor; and
automatically update the real-time display on the monitor with the tracking image to continue to show the tracking node during the navigation of the tracking node.

2. The OSS sensor driven display system of claim 1, wherein the at least one controller is further configured to control the real-time display on the monitor of an axial directional view of the tracking image as a function of the location of the tracking node of the interventional device relative to the image space as indicated by the position tracking data.

3. The OSS sensor driven display system of claim 1, wherein the at least one controller is further configured to control the real-time display on the monitor of a non-axial directional view of the tracking image as a function of the location and the orientation of the tracking node of the interventional device relative to the image space as indicated by the position tracking data.

4. The OSS sensor driven display system of claim 1, wherein the at least one controller is further configured to control a display of a zoomed-in image of the tracking node of the interventional device as illustrated within the tracking image.

5. The OSS sensor driven display system of claim 1, wherein the at least one controller is further configured to control a display of a zoomed-in image of a non-tracking node of the interventional device relative to the tracking image as indicated by the position tracking data.

6. The OSS sensor driven display system of claim 1, wherein the at least one controller is further configured to control a positioning of the imaging system relative to the anatomical region for acquiring the volume image; and
wherein the at least one controller derives the positioning of the imaging system relative to the anatomical region from the location of the tracking node of the interventional device relative to the image space.

7. The OSS sensor driven display system of claim 1, wherein each of the spatial images in each series of spatial images is a two-dimensional (2D) image slice of the image space.

8. The OSS sensor driven display system of claim 1, wherein each of the spatial images in each series of spatial images is a three-dimensional (3D) image slice of the image space.

9. The OSS sensor driven display system of claim 1, wherein the at least one controller is further configured to:
rotate the selected tracking image to show a desired directional view of the tracking node based on the orientation of the tracking node; and
automatically update the real-time display on the monitor with the rotated tracking image to continue to show the tracking node during the navigation of the tracking node.

10. An optical shape sensing (OSS) sensor driven display system, comprising:
an interventional device including an OSS sensor integrated with at least one interventional tool;
a monitor; and
at least one controller for controlling a real-time display on the monitor of a tracking image illustrative of a navigation of a tracking node of the interventional device within an anatomical region during a minimally invasive procedure, wherein the at least one controller is configured to:
receive a plurality of series of spatial images in an image space of a volume image of the anatomical region acquired by an imaging system into a plurality of series of spatial images, wherein the plurality of series of spatial images are along a plurality of different axial directions, respectively, wherein each series of spatial images is illustrative of the anatomical region in the image space;
register the OSS sensor to each spatial image in the plurality of series of spatial images via individual registration matrixes, respectively, based on position tracking data informative of a position of the OSS sensor within the anatomical region;
identify a registered spatial image in each series of spatial images showing the tracking node of the interventional device to ascertain a location and an orientation of the tracking node relative to each identified spatial image;
autonomously select the tracking image for display as the identified spatial image that includes the location and the orientation of the tracking node of the interventional device relative to the image space;
when the position tracking data indicates the orientation of the tracking node has changed direction, autonomously select the tracking image as another spatial image in the changed direction from the identified spatial image to replace the tracking image for the real-time display on the monitor; and
automatically update the real-time display on the monitor with the tracking image to continue to show the tracking node during the navigation of the tracking node.

11. The OSS sensor driven display system of claim 10, wherein the at least one controller is further configured to control a display of a zoomed-in image of the tracking node of the interventional device as illustrated within the tracking image.

12. The OSS sensor driven display system of claim 10, wherein the at least one controller is further configured to control a display of a zoomed-in image of a non-tracking node of the interventional device relative to the tracking image as indicated by the position tracking data.

13. The OSS sensor driven display system of claim 10, wherein the at least one controller is further configured to control a real-time display of at least one spatial image adjacent the tracking image.

14. The OSS sensor driven display system of claim 10, further comprising:
the imaging system configured to generate the volume image of the anatomical region;
wherein the at least one controller is configured to control a positioning of the imaging system relative to the anatomical region; and
wherein the at least one controller derives the positioning of the imaging system relative to the anatomical region from the location of the tracking node of the interventional device relative to the image space as indicated by the position tracking data.

15. A method for tracking an interventional device including an integration of an optical shape sensing (OSS) sensor and at least one interventional tool in an anatomical region, the method comprising:
receiving a plurality of series of spatial images in an image space of a volume image of the anatomical region acquired by an imaging system into a plurality of series of spatial images, wherein the plurality of series of spatial images are along a plurality of different axial directions, respectively, wherein each series of spatial images is illustrative of the anatomical region in the image space;
registering the OSS sensor to each spatial image in the plurality of series of spatial images based on position tracking data informative of a position of the OSS sensor within the anatomical region;
identifying a registered spatial image in each series of spatial images showing a tracking node of the interventional device to ascertain a location and an orientation of the tracking node of the interventional device relative to each identified spatial image;
autonomously selecting a tracking image as the identified spatial image that includes the location and the orientation of the tracking node of the interventional device;
when the position tracking data indicates the orientation of the tracking node has changed direction, autonomously selecting the tracking image as another spatial image in the changed direction from the identified spatial image to replace the tracking image; and
updating a real-time display on a monitor with the tracking image to continue to show the tracking node during a navigation of the tracking node of the interventional device within the anatomical region during a minimally invasive procedure.

16. The method of claim 15, wherein the real-time display on the monitor includes an axial directional view of the tracking image as a function of the location of the tracking node of the interventional device relative to the image space as indicated by the position tracking data.

17. The method of claim 15, wherein the real-time display on the monitor includes a non-axial directional view of the tracking image as a function of the location and the orientation of the tracking node of the interventional device relative to the image space as indicated by the position tracking data.

18. The method of claim 15, further comprising:
controlling a display of a zoomed-in image of the tracking node of the interventional device as illustrated within the tracking image; and
controlling a display of a zoomed-in image of a non-tracking node of the interventional device relative to the tracking image as indicated by the position tracking data.

19. The method of claim 15, further comprising:
controlling a positioning of the imaging system relative to the anatomical region, the imaging system being operable for generating the volume image of the anatomical region; and
deriving the positioning of the imaging system relative to the anatomical region from the position of the tracking node of the interventional device relative to the image space as indicated by the position tracking data.

* * * * *